United States Patent
Yang et al.

(10) Patent No.: US 12,298,982 B2
(45) Date of Patent: May 13, 2025

(54) DIVERSITY AND EXPLAINABILITY PARAMETERS FOR RECOMMENDATION ACCURACY IN MACHINE LEARNING RECOMMENDATION SYSTEMS

(71) Applicant: Salesforce, Inc., San Francisco, CA (US)

(72) Inventors: Wenzhuo Yang, Singapore (SG); Jia Li, Mountain View, CA (US); Chenxi Li, Belmont, CA (US); Latrice Barnett, Oakland, CA (US); Markus Anderle, Moraga, CA (US); Simo Arajarvi, Dublin (IE); Harshavardhan Utharavalli, Hyderabad (IN); Caiming Xiong, Menlo Park, CA (US); Richard Socher, Menlo Park, CA (US); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 24 days.

(21) Appl. No.: 17/093,885

(22) Filed: Nov. 10, 2020

(65) Prior Publication Data

US 2021/0374132 A1    Dec. 2, 2021

(30) Foreign Application Priority Data

Jun. 1, 2020    (IN) .............................. 202021022981

(51) Int. Cl.
*G06F 16/2457*    (2019.01)
*G06N 20/20*    (2019.01)

(52) U.S. Cl.
CPC ......... *G06F 16/2457* (2019.01); *G06N 20/20* (2019.01)

(58) Field of Classification Search
CPC ........................... G06F 16/2457; G06N 20/20
See application file for complete search history.

(56) References Cited

U.S. PATENT DOCUMENTS

| | | | |
|---|---|---|---|
| 11,004,135 B1 * | 5/2021 | Sandler | G06Q 30/0631 |
| 2019/0392330 A1 * | 12/2019 | Martineau | G06N 5/04 |
| 2021/0118034 A1 * | 4/2021 | Indrakanti | G06F 16/248 |

OTHER PUBLICATIONS

Adomavicius et al., 2012, "Improving Aggregate Recommendation Diversity Using Ranking-Based Techniques," IEEE Trans. on Knowl. and Data Eng. 24, 5 (2012), 15 pages.

(Continued)

*Primary Examiner* — Khanh B Pham
*Assistant Examiner* — Ranjit P Doraiswamy
(74) *Attorney, Agent, or Firm* — Haynes and Boone, LLP

(57) ABSTRACT

Embodiments are directed to a machine learning recommendation system. The system receives a user query for generating a recommendation for one or more items with an explanation associated with recommending the one or more items. The system obtains first features of at least one user and second features of a set of items. The system provides the first features and the second features to a first machine learning network for determining a predicted score for an item. The system provides a portion of the first features and a portion of the second features to second machine learning networks for determining explainability scores for an item and generating corresponding explanation narratives. The system provides the recommendation for one or more items and corresponding explanation narratives based on ranking predicted scores and explainability scores for the items.

20 Claims, 12 Drawing Sheets

(56) References Cited

OTHER PUBLICATIONS

Brynjolfsson et al., Jan. 2011, "Goodbye Pareto Principle, Hello Long Tail: The Effect of Search Costs on the Concentration of Product Sales," Management Science 57, 8 (2011), 32 pages.
Brynjolfsson et al., Nov. 2003, "Consumer Surplus in the Digital Economy: Estimating the Value of Increased Product Variety at Online Booksellers," Management Science 49, 11 (2003), 1580-1596.
Chen et al., Jul. 8-12, 2018, "Attention-Driven Factor Model for Explainable Personalized Recommendation," In the 41st International ACM SIGIR Conference on Research & Development in Information Retrieval (SIGIR '18). 909-912.
Chen et al., 2018, "Fast Greedy Map Inference for Determinantal Point Process to Improve Recommendation Diversity," In Proceedings of the 32nd International Conference on Neural Information Processing Systems (NIPS'18). 5627-5638.
Chen et al., 2019, "Personalized Fashion Recommendation With Visual Explanations Based on Multimodal Attention Network: Towards Visually Explainable Recommendation," In Proceedings of the 42nd International ACM SIGIR Conference on Research and Development in Information Retrieval (SIGIR'19). 765-774.
Cheng et al., Jun. 24, 2016, "Wide & Deep Learning for Recommender Systems," In Proceedings of the 1st Workshop on Deep Learning for Recommender Systems (DLRS 2016). 7-10.
Covington et al., Sep. 15-19, 2016, "Deep Neural Networks for Youtube Recommendations," In Proceedings of the 10th ACM Conference on Recommender Systems (RecSys '16). 191-198.
Devlin et al., May 24, 2019, "BERT: Pre-Training of Deep Bidirectional Transformers for Language Understanding," In Proceedings of the 2019 Conference of the North American Chapter of the Association for Computational Linguistics: Human Language Technologies, vol. 1 (Long and Short Papers), 16 pages.
Donkers et al., Aug. 27-31, 2017, "Sequential User-Based Recurrent Neural Network Recommendations," In Proceedings of the Eleventh ACM Conference on Recommender Systems (RecSys '17). 152-160.
Guo et al., 2017, "DeepFM: A Factorization-Machine Based Neural Network for CTR Prediction," In Proceedings of the 26th International Joint Conference on Artificial Intelligence (IJCAI'17). AAAI Press, 1725-1731.
Ho et al., Feb. 24-28, 2014, "Who Likes It More? Mining Worth-Recommending Items From Long Tails by Modeling Relative Preference," In Proceedings of the 7th ACM International Conference on Web Search and Data Mining (WSDM '14). 253-262.
Hu et al., 2008, "Collaborative Filtering for Implicit Feedback Datasets," In Proceedings of the 2008 Eighth IEEE International Conference on Data Mining (ICDM '08). 263-272.
Kim et al., 2019, "Sequential and Diverse Recommendation With Long Tail," In Proceedings of the Twenty-Eighth International Joint Conference on Artificial Intelligence, IJCAI 2019, Macao, China, Aug. 10-16, 2019. 2740-2746.
Krizhevsky et al., 2012, "Imagenet Classification With Deep Convolutional Neural Networks," In Proceedings of the 25th International Conference on Neural Information Processing Systems—vol. 1 (NIPS'12), 9 pages.
McAuley et al., Oct. 12-16, 2013, "Hidden Factors and Hidden Topics: Understanding Rating Dimensions With Review Text." In Proceedings of the 7th ACM Conference on Recommender Systems (RecSys '13). 165-172.
Peake et al., Aug. 19-23, 2018, "Explanation Mining: Post Hoc Interpretability of Latent Factor Models for Recommendation Systems," In Proceedings of the 24th ACM SIGKDD International Conference on Knowledge Discovery & Data Mining, KDD 2018, London, UK, Aug. 19-23, 2018. 2060-2069.
Steffen Rendle. 2010, "Factorization Machines," In Proceedings of the 2010 IEEE International Conference on Data Mining (ICDM '10). 995-1000.
Marco Tulio Ribeiro et al., 2016, "Why Should I Trust You?": Explaining the Predictions of Any Classifier, In Proceedings of the 22nd ACM SIGKDD International Conference on Knowledge Discovery and Data Mining (KDD '16). 1135-1144.
Salakhutdinov et al., 2007, "Restricted Boltzmann Machines for Collaborative Filtering," In Proceedings of the 24th International Conference on Machine Learning (ICML '07). 791-798.
Shan et al., Aug. 13-17, 2016, "Deep Crossing: Web-Scale Modeling Without Manually Crafted Combinatorial Features," In Proceedings of the 22nd ACM SIGKDD International Conference on Knowledge Discovery and Data Mining (KDD '16). 255-262.
Sundararajan et al., 2017, "Axiomatic Attribution for Deep Networks," In Proceedings of the 34th International Conference on Machine Learning (ICML'17). 3319-3328.
Wang et al., Aug. 17, 2017, "Deep & Cross Network for Ad Click Predictions," In Proceedings of the ADKDD'17 (ADKDD'17).
Wang et al., Apr. 21, 2020, "Personalized Re-Ranking for Improving Diversity in Live Recommender Systems," arXiv:cs.IR/2004.06390.
Wilhelm et al., Oct. 2018, "Practical Diversified Recommendations on Youtube With Determinantal Point Processes," In Proceedings of the 27th ACM International Conference on Information and Knowledge Management (CIKM '18). 2165-2173.
Zhang et al., Oct. 23-25, 2008, "Avoiding Monotony: Improving the Diversity of Recommendation Lists," In Proceedings of the 2008 ACM Conference on Recommender Systems (RecSys '08). 123-130.
Zhang et al., Jul. 6-11, 2014, "Explicit Factor Models for Explainable Recommendation Based on Phrase-Level Sentiment Analysis," In Proceedings of the 37th International ACM SIGIR Conference on Research & Development in Information Retrieval (SIGIR '14). 83-92.
Zhou et al., Sep. 13, 2018, "Deep Interest Network for Click-Through Rate Prediction," In Proceedings of the 24th ACM SIGKDD International Conference on Knowledge Discovery & Data Mining (KDD '18). 9 pages.
Ziegler et al., May 10-14, 2005, "Improving Recommendation Lists Through Topic Diversification," In Proceedings of the 14th International Conference on World Wide Web (WWW '05). 22-32.

\* cited by examiner

DIVERSITY AND EXPLAINABILITY PARAMETERS FOR RECOMMENDATION ACCURACY IN MACHINE LEARNING RECOMMENDATION SYSTEMS

CROSS-REFERENCE

The present application claims priority to Indian Patent Application No. 202021022981, filed on Jun. 1, 2020, which is incorporated herein by reference in its entirety.

TECHNICAL FIELD

The disclosure relates generally to machine learning systems and more specifically to determining diversity and explainability parameters for recommendation accuracy in machine learning recommendation systems.

BACKGROUND

Neural networks have demonstrated promise as a technique for automatically analyzing real-world information with human-like accuracy. Neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks use machine learning to make predictions gradually, by trial and error. For example, a neural network model may be trained using a large number of training samples, proceeding iteratively until the neural network model begins to consistently make similar inferences from the training samples that a human may make Neural network models have shown potential to outperform other computing techniques in a number of applications. Indeed, in some applications neural networking models may exceed human-level performance.

Recommendation systems are components in various commercial applications, such as online advertising, online retail, video and music services, mobile and cloud application data stores, etc. Given a user profile and contextual information, the objective in many recommendation systems is to find relevant items and rank the relevant items to optimize metrics, such as clicks or purchases. In some instances, recommendation systems may be implemented using a machine learning neural network which receives input information about an item and predicts a recommendation for that item based on the received input information.

Figure 1:
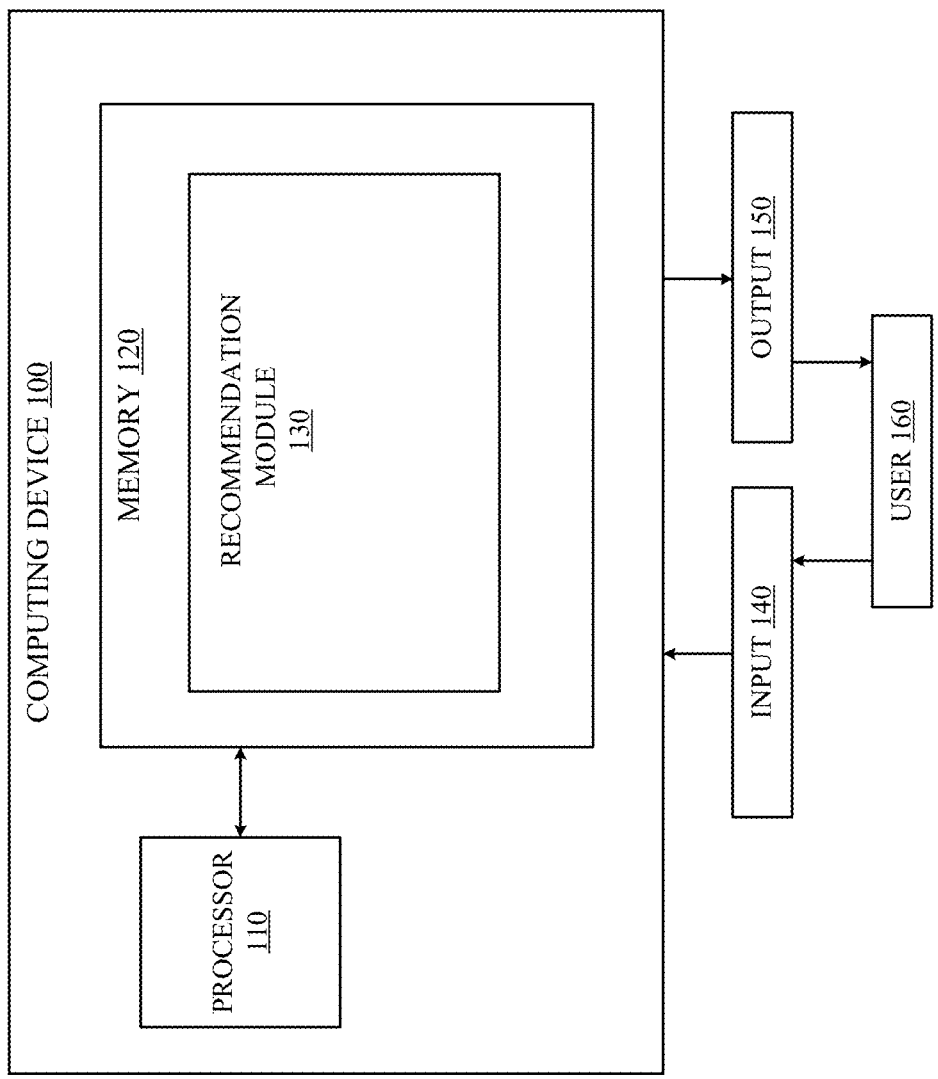
FIG. 1 is a simplified diagram of a computing device with a recommendation module, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The subject technology provides for a machine reading recommendation system that generates meaningful and relevant recommendations for items, such as applications. This may reduce the amount of user interaction in identifying and/or selecting applications and increase performance metrics in terms of the number of applications transacted with the user or other users.

Recommendation accuracy, diversity, and explainability are some factors in high-quality recommendation systems. Recommendation accuracy measures the ability to predict items that a certain user prefers. Recommendation diversity measures the ability to provide a user with highly personalized items. Diverse recommendations can create more opportunities for users to get recommended personalized items or relevant but unpopular items, among other recommendations. For example, in one existing recommendation approach provides different item re-ranking techniques that can generate recommendations with substantially higher aggregate diversity across all users, while maintaining comparable levels of accuracy. In another existing recommendation approach, a statistical model of recommendation diversity is based on determinantal point processes and achieves long-term increases in user engagement. Some other recommendation approaches show that recommending "long-tail" type of items can be used for certain ecommerce-based merchant sites, such as online bookstores.

Besides accuracy and diversity, the disclosure is directed to improving transparency, persuasiveness, and/or trustworthiness of the recommendation system. As such, recommendation explainability scores or metrics can provide explanations to users for why certain items are recommended. The embodiments are directed to a recommendation system that uses diversity measures and explainability scores or metrics for recommending relevant applications.

Explainable recommendations are used in a recommendation system to clarify why certain items are recommended. Generating explanations along with recommended items may improve transparency, trustworthiness, and/or user satisfaction of the recommendation systems. Recommendation explanations may help diagnose and/or refine recommendation algorithms. In some aspects, there are two directions for designing explainable recommendation algorithms. One direction focuses on developing intrinsic explainable models such as many of factorization-based, topic modeling, and deep learning methods. The other focuses on the explainability of the recommendation results by treating recommendation models as black boxes and developing separate models for explanation.

Existing recommendation algorithms attempt to improve recommendation accuracy by moving from traditional machine learning approaches to deep learning approaches. Among deep learning approaches, a wide-and-deep model combines memorization and generalization for recommendation systems by jointly training a linear model with a deep neural network (DNN) model. For example, a model referred to as deep factorization machine (DeepFM) can extend factorization machines with a DNN model to represent high-order feature interactions. In another example, a deep interest network can learn the representation of user interests from historical behaviors with a local activation module to improve the expressive ability. However, there are drawbacks with these existing approaches in recommendation systems.

The embodiments are directed to a recommendation system that interacts with a user or a set of users such that the accuracy, diversity, and/or explainability factors are considered. To satisfy these factors, the embodiments are directed to a novel framework for improving aggregate recommendation diversity without reducing offline accuracy metrics, generating recommendation explanations reliably, and/or supporting a wide variety of models for recommendation accuracy. The framework may be trained in an end-to-end manner and deployed as a recommendation service. Furthermore, the framework may also be applied to other generic recommendation systems.

The recommendation system described herein may involve source users that select applications based on a recommendation, third-party application vendors or developers that provide and develop the applications, and target users that purchase or install the recommended applications. Application vendors/developers may develop applications on a cloud-based platform for solving specific business problems, helping to bring the platform's benefits to real business use cases. The source users may connect the applications and vendors or developers with target users who apply these applications to solve their own business problems. The source users can analyze needs of the target users and advise the target users which applications to install or purchase. In prior approaches, the source users would manually recommend specific applications to the target users based on the objectives and behavioral patterns of the target users. In some instances, the source users may be target users. The subject recommendation system may provide a service to the source users by identifying specific applications, allowing the source users to interact with the recommendation system and obtain more information, by, for example, controlling recommendation diversity measures for exploring unpopular but relevant applications and/or understanding why such applications are recommended. Aggregate diversity measures may provide more exposure opportunities for application vendors or developers and provide additional reasoning metrics relating to requirements of the target users. Explainability scores or metrics may improve the transparency and trustworthiness of the subject recommendation system and facilitate the analysis of recommended applications to the set of source users.

As used herein, the term "network" may comprise any hardware-based or software-based framework that includes any artificial intelligence network or system, neural network or system, and/or any training or learning models implemented thereon or therewith.

As used herein, the terms "machine learning," "machine learning procedure," "machine learning operation," and "machine learning algorithm" generally refer to any system or analytical and/or statistical procedure that may progressively improve computer performance of a task.

As used herein, the term "module" may comprise hardware-based and/or software-based frameworks that perform one or more functions. In some embodiments, the module may be implemented on one or more neural networks, such as one or more supervised and/or unsupervised neural networks, convolutional neural networks, and/or memory-augmented neural networks, among others.

FIG. 1 is a simplified diagram of a computing device 100 that implements a recommendation system, according to some embodiments. Computing device 100 includes processor 110 and memory 120.

Processor 110 may be coupled to memory 120. Operation of computing device 100 is controlled by processor 110. Although computing device 100 is shown with only one processor 110, it is understood that processor 110 may be representative of one or more central processing units (CPUs), multi-core processors, microprocessors, microcontrollers, and/or the like in computing device 100. Although processor 110 may include one or more general purpose central processing units (CPUs), processor 110 may additionally or alternately include at least one processor that provides accelerated performance when evaluating neural network models. For example, processor 110 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general-purpose CPU. Computing device 100 may be implemented as a stand-alone subsystem, as a board added to a computing device, and/or as a virtual machine.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

Memory 120 may be used to store instructions executable by computing device 100 and/or one or more data structures used during operation of computing device 100. Memory 120 may include one or more types of machine-readable media. In some examples, memory 120 may include non-transitory, tangible, machine-readable media that includes executable code that when run by one or more processors (e.g., processor 110) may cause the one or more processors to perform the methods described in further detail herein. Memory 120 may include various types of short-term and/or long-term storage modules including cache memory, random access memory (RAM), static random access memory (SRAM), dynamic random access memory (DRAM), non-volatile memory (NVM), flash memory, solid state drives (SSD), hard disk drive (HDD), optical storage media, magnetic tape, any other memory chip or cartridge, and/or any other medium from which a processor or computer is adapted to read. Some common forms of machine-readable media may include flexible disk, hard disk, magnetic tape, any other magnetic medium, compact disk read-only memory (CD-ROM), any other optical medium, punch cards, paper tape, any other physical medium with patterns of holes, programmable read-only memory (PROM), erasable programmable read-only memory (EPROM), electrically erasable programmable read-only memory (EEPROM), any other memory chip or cartridge, and/or any other medium from which a processor or computer is adapted to read.

In some embodiments, memory 120 includes a recommendation system that is implemented as a recommendation module 130. Recommendation module 130 may receive and process input 140 from user 160 or another computing device and generate output 150. The input 140 may be a query for a recommendation and output 150 may be a recommendation for one or more items and an explanation narrative associated with the one or more items. The items may be applications or other recommended items such as movies, goods, services, etc. The explanation narrative may correspond to an item in the recommendation and explain why a particular item was selected and provided in the recommendation. User 160 may be a source user that is requesting a recommendation or a target user associated with user information that recommendation module 130 uses to provide a recommendation.

In some embodiments, recommendation module 130 may include one or more neural networks that are described in detail below. Neural networks may be implemented using multiple neural network layers. Examples of neural network layers may include densely connected layers, convolutional layers, recurrent layers, pooling layers, dropout layers, and/or the like.

Prior to recommendation module 130 generating a recommendation, recommendation module 130 may be trained using a machine learning process. Examples of machine learning processes include supervised learning, reinforcement learning, unsupervised learning, and/or the like. Further a machine learning process may comprise a trained algorithm that is trained through supervised learning (e.g., various parameters are determined as weights or scaling factors). The machine learning process may comprise one or more of regression analysis, regularization, classification, dimensionality reduction, ensemble learning, meta learning, association rule learning, cluster analysis, anomaly detection, deep learning, or ultra-deep learning. The machine learning process may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principle component regression, least absolute shrinkage and selection operation, least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

In some embodiments, recommendation module 130 may be implemented using hardware, software, and/or a combination of hardware and software. Further, although recommendation module 130 is shown on a single computing device, it should be appreciated that the recommendation module 130 may be implemented using multiple computing devices 100.

Figure 2:
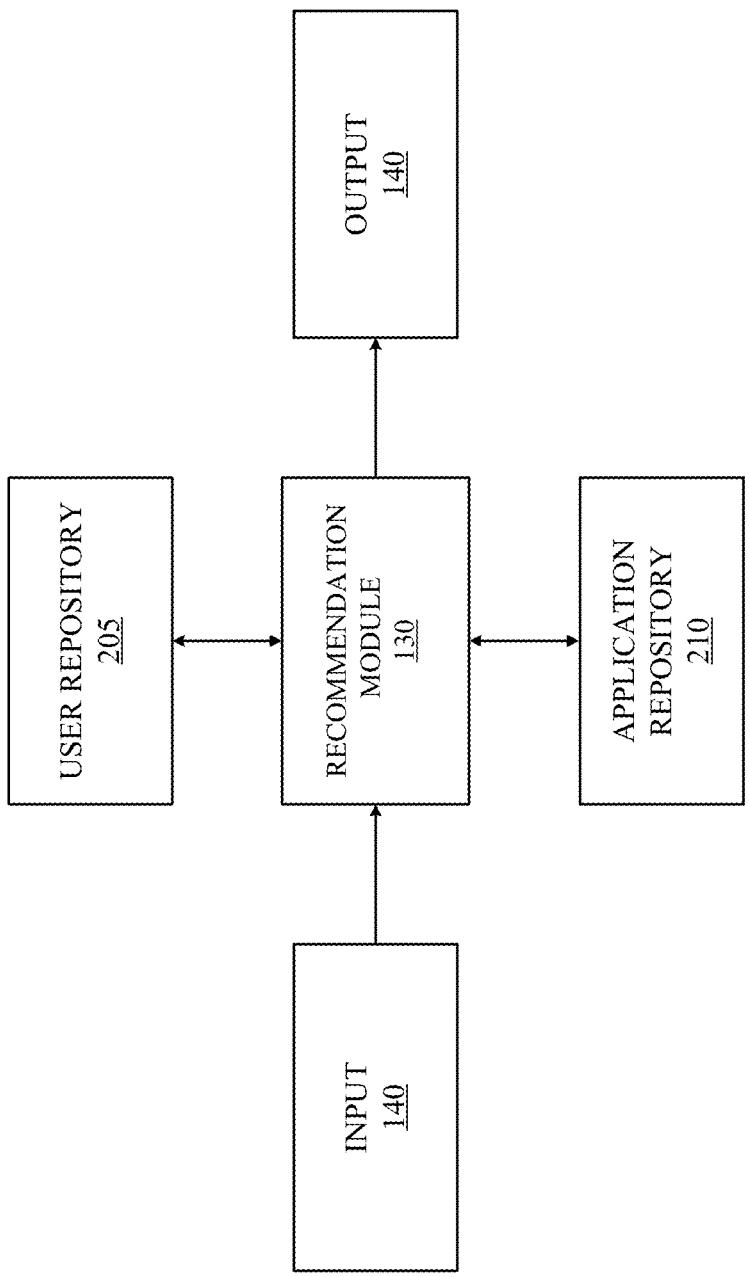
FIG. 2 is a simplified diagram of a recommendation module, according to some embodiments.

FIG. 2 is a simplified diagram 200 of a recommendation module 130 may be implemented. The recommendation module 130 may improve application installations by leveraging meaningful information from a user profile or user purchase/installation history. As illustrated in FIG. 2, the recommendation service may include a user repository 205 and application repository 210. User repository 205 may include user information such as a user profile and user purchase and installation history. Recommendation module 130 may access the user information using a user identifier, which may be provided to recommendation module 130 as input 140.

Application repository 210 may include application or item information that recommendation module 130 may recommend to user 160. Example application or item information may include an application or item identifier and application or item name. Recommendation module 130 may access the application or item information using the application or item identifier.

In some embodiments, recommendation module 130 may combine data in user repository 205 and application repository 210 into features. As will be described below, recommendation module 130 may use the features to determine output 150 which includes a recommendation with recommended application(s) and corresponding explanation(s) for the recommended applications. The features may be categorical features, multi-group categorical features, and continuous-valued features. The categorical features may include the user profile information, such as "country= USA", "market=ESMB" and "industry={healthcare, life sciences}. The continuous features include user behavior, such as cloud usage, application deployment status, etc. Information for categorical and continuous features may be included in user repository 205. For the items or applications, the features may include the application or item IDs and the application or item name, such as "Service 1" and "Service 2 Sales Navigator". The application features may be stored in application repository 210.

In some embodiments, the categorical features and words may be converted into a low-dimensional and/or dense real-valued embedding vector using an embedder (not shown). The continuous-valued features may be concatenated together, forming a single dense feature vector.

In some embodiments, recommendation module 130 may format the features, such that given user i and item j, $x_{ij}$ may be the input features, such as categorical features and continuous-valued features, and $y_{ij}$ may be the user action label. For example, y=1 may indicate an "installed" action and y=0 may indicate a "not installed" action.

Based on the user input 140 and features that recommendation module 130 retrieves from user repository 205 and application repository 210, recommendation module 130 may generate output 150 that includes a recommendation. In some embodiments, output 150 may include a set of application or items with each application or item in the set including an explanation for why the recommendation module 130 recommended the application or item. The explanation may improve transparency, persuasiveness and trustworthiness of the recommendation module 130 which may encourage user 160 to install or purchase the recommended application. Additionally, the set of items or applications may be accurate and personalized to the user and may include novel items or applications instead of only popular items or applications.

Figure 3:
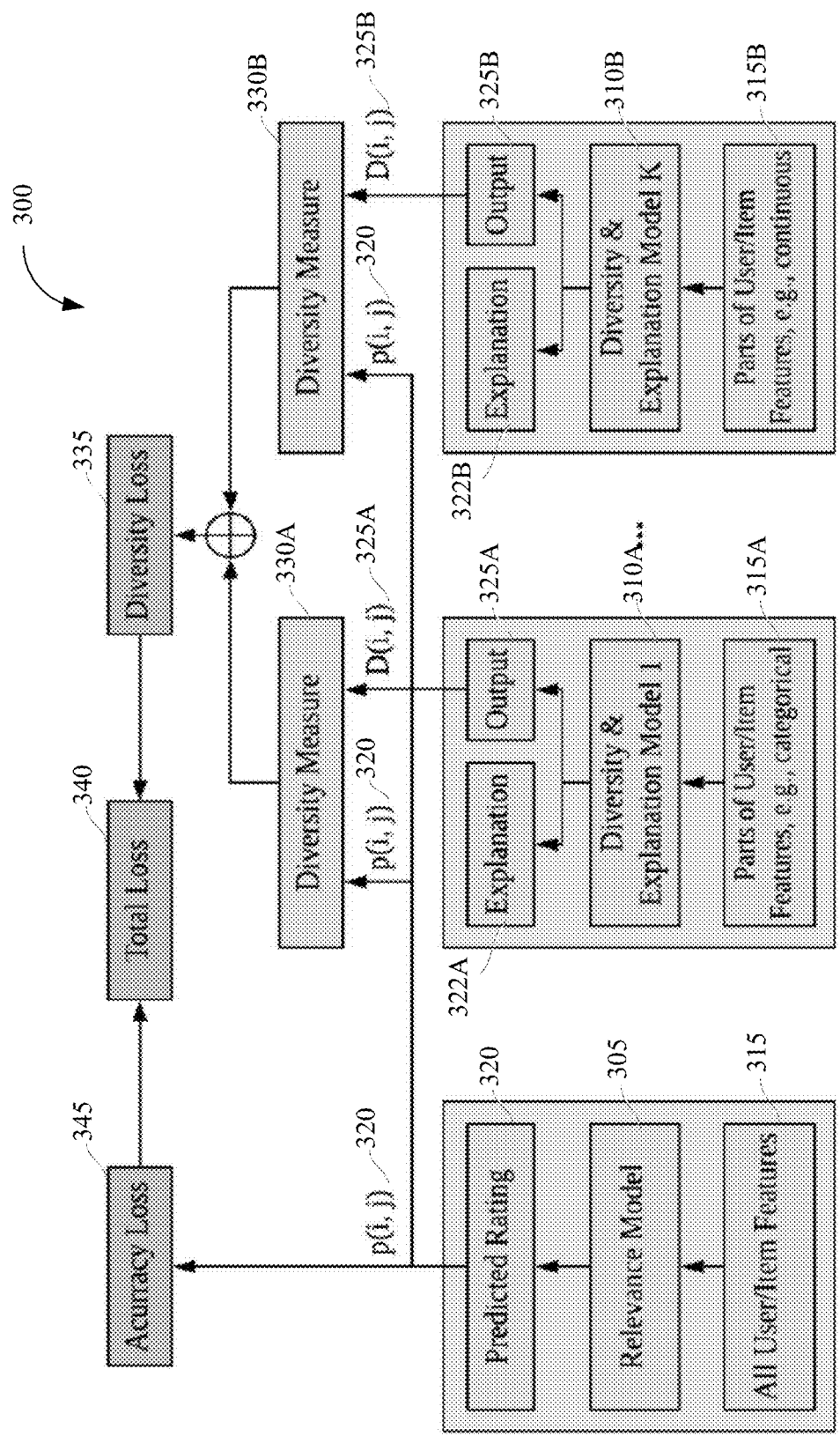
FIG. 3 is a simplified machine learning architecture of a recommendation module, according to some embodiments.

FIG. 3 is a simplified diagram 300 of an architecture of a recommendation module, according to some embodiments. Recommendation module 130 may be a unified recommendation framework that includes one or more models. Example models may be a relevance model 305 and one or more diversity and explanation (DAE) models 310. For example purposes only, FIG. 3 illustrates a categorical DAE model 310A and continuous DAE model 310B. Although discussed in terms of one or more neural network models, relevance model 305 and DAE models 310 may include or utilize different types of machine learning algorithms as well.

In some embodiments, relevance model 305 may determine accuracy and one or more DAE models 310 may determine diversity and explainability for the recommended items or applications. Relevance model 305 may be specific to a particular recommendation platform or may be replaced with other existing recommendation models that are trained to perform one or more recommendation tasks.

In some embodiments, relevance model 305 may receive input features 315. Input features 315 may be features $x_{ij}$ discussed in FIG. 2. The DAE models 310 may receive a portion of input features 315 that are specific to the DAE model 310. For example, categorical DAE model 310A may receive categorical features 315A and continuous DAE model 310B may receive continuous features 315B. Relevance model 305 and DAE models 310 may also receive item features as part of input features 315. The item features may be features for items included in the user history or for other items.

In some embodiments, relevance model 305 may be trained to learn the probability P(y|x) of an action label y given the input features x and generate a predicted score 320. The probability P(y|x) may be formulated by minimizing the negative log-likelihood function.

In some embodiments, the DAE models 310 may provide a way to control aggregate diversity by generating a distribution D 325 and a recommendation explanation 322. This may be achieved by optimizing a diversity score or measure and/or optimizing an explainability score or metric as discussed below. The recommendation explanation 322 may be an explanation narrative.

For illustration purposes, suppose that there are n users and m items for which input features 315 may be generated. Given user i and item j, suppose that the predicted score 320 generated by the relevance model 305 is denoted by p (i, j) and the output 325 of each DAE model 310 is a distribution D(i, j) parameterized by its output g(i, j). In some embodiments, categorical DAE model 310A may generate distribution 325A and explanation 322A and continuous DAE model 310B may generate distribution 325B and explanation 322B.

Let z(i, j)=p(i, j)+q(i, j) be the combination of the predicted score 320 from relevance model 305 and distributions 325 from the DAE models 310, where q(i, j) is drawn from distribution D(i, j). Let Q(i) be the distribution of the random vector $z(i)=(z(i, 1), z(i, 2), \ldots, z(i, m))^T$, where m is the number of items. Then the diversity score or measure 330 may be defined as the negative Kullback-Leibler (KL) divergence between Q(i) and a specific predefined distribution P, such as $-D_{KL}(P\|Q(i))$. For example, if distribution P is the Gaussian distribution $N(\mu, \Sigma)$ with $\mu=0.5$, $\Sigma=\sigma I$ (where $\sigma$ is a constant and I is the identity matrix), then maximizing this diversity measure makes Q(i) close to distribution P so that the distribution of z (i, j) is close to $N(0.5, \sigma)$. This leads to more diverse recommendation results when the recommendation module 130 recommends items in items j to user i by ranking the scores drawn from distribution Q(i). To control recommendation diversity in the prediction step, the recommendation module 130 may introduce a weight parameter $w \in [0, 1]$ so that the predicted rating of user i for item j is p(i, j)+w*q(i, j), where q(i, j)~D(i, j), providing the recommendation module 130 the ability to explore novel items by tuning w.

The DAE models 310 may provide the recommendation module 130 with more flexibility to satisfy other requirements, such as generating a recommendation explanation by optimizing an explainability score or metric. Specifically, recommendation module 130 may decouple different kinds of features from the input features 315 that are an input to the relevance model 305, by designing specific DAE models 310 for different features. As illustrated above, categorical features 315A may be an input to categorical DAE model 310A and continuous features 315B may be an input to continuous DAE model 310B. Accordingly, categorical DAE model 310A may generate diversity score or measure 330A which is different from the diversity score or measure 330B that is generated using continuous DAE model 310B. For example, given user i and item j, categorical DAE model 315A receives the user categorical features 315A, outputting the distribution D(i, j) (distribution 325A) for diversity control and generating the corresponding categorical feature-level based explanation 322A. Similarly, given user i and item j, continuous DAE model 315B receives the continuous features 315B, outputting the distribution D(i, j) (distribution 325B) for diversity control and generating the corresponding continuous feature-level based explanation 322B.

In some embodiments, relevance model 305 may generate predicted score 320 and determine accuracy loss 345 from predicted score 320. The DAE models 310 may generate distributions 325. Distributions 325 may be used to generate a diversity loss 335. Suppose, that recommendation module 130 includes K number of DAE models 310, where each DAE model 310 corresponds to a different purpose. Then, the total loss 340 of the recommendation module 130 may be a combination of accuracy loss 345 and diversity loss 335, and may be defined as:

$$L = \frac{1}{|S|} \sum_{(i,j) \in S} \text{Accuracy\_loss}(p(i, j), y_{ij}) + \frac{1}{nK} \sum_{k=1}^{K} \sum_{i \in \mathcal{U}} D_{KL}(\mathcal{P} \| Q_k(i)), \quad \text{Eq. (1)}$$

where, S is the training dataset, n is the number of users, and $\mathcal{P}$ is a predefined distribution, and K is a number of DAE models 310, and accuracy loss is accuracy loss 345. In some embodiments, the accuracy loss 345 is the log loss function or the cross-entropy loss function that is determined from predicted score 320. In this case, the relevance model 305 and DAE models 310 can be trained together in an end-to-end manner. In other embodiments, the accuracy loss 345 may be the likelihood loss function, hinge loss function, generalized smooth hinge function, Huber loss function, mean-absolute error (L1) loss function, mean-squared error (L2) loss function, exponential loss function, Savage loss function, tangent loss function, or any other loss function.

Figure 4:
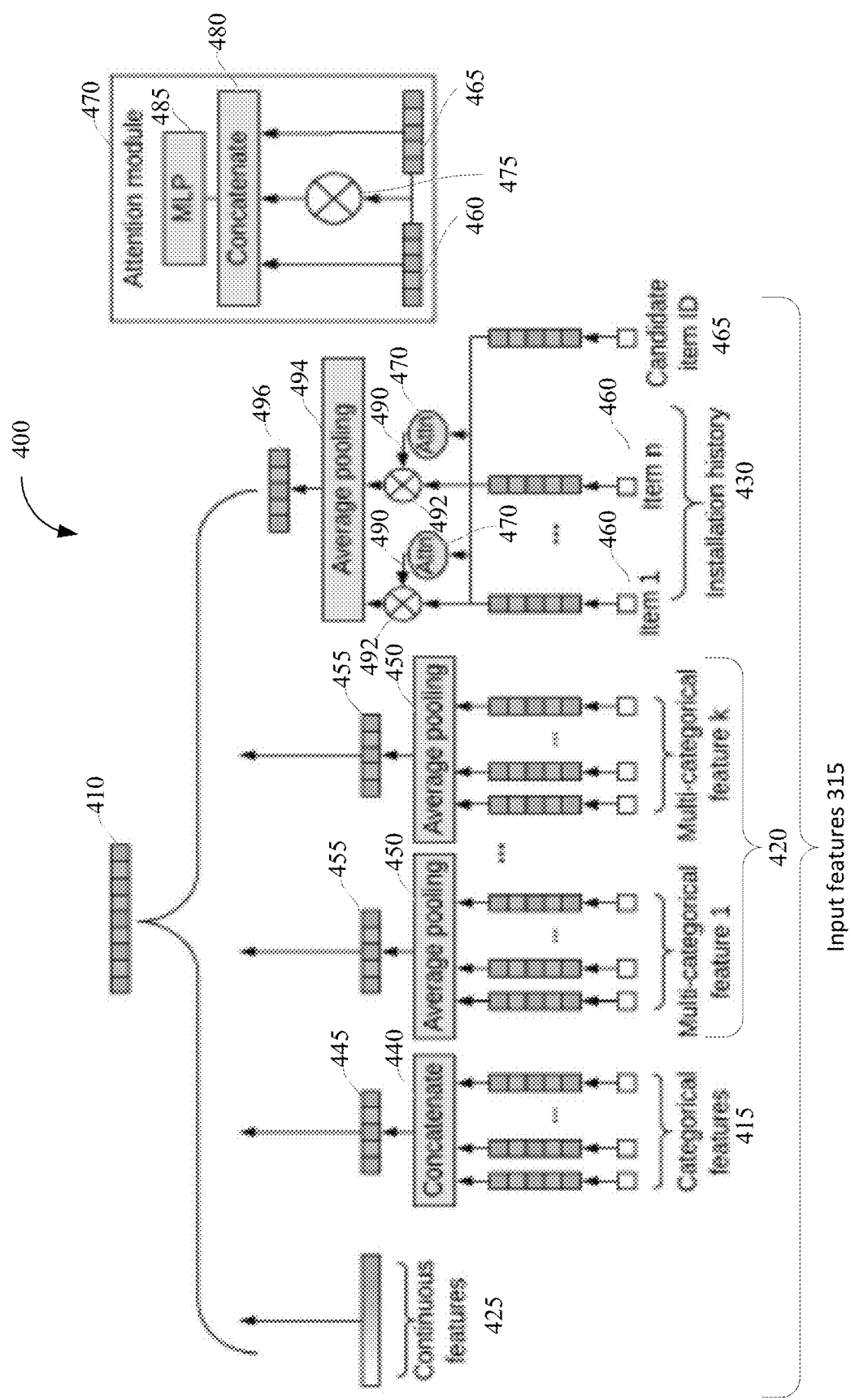
FIGS. 4-6 are simplified machine learning diagrams of architectures of a relevance model, according to some embodiments.
Figure 5:
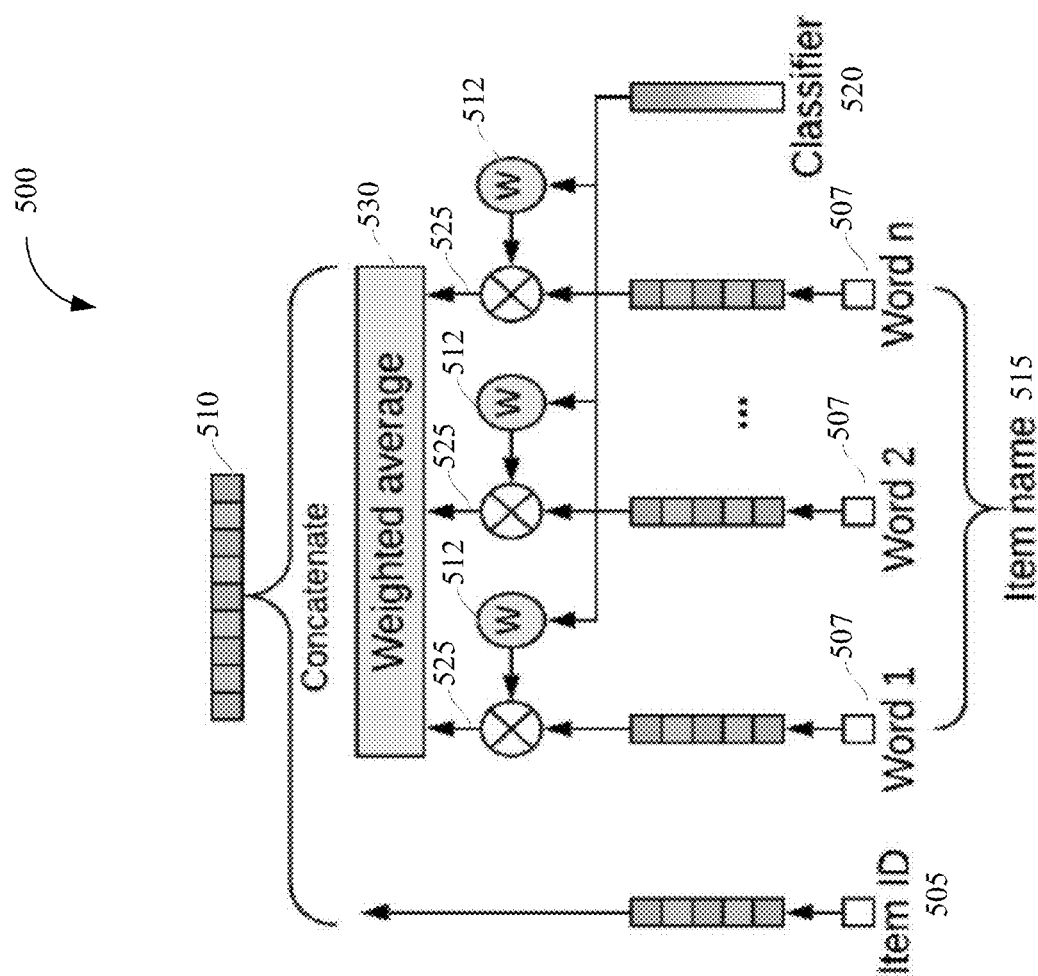
Figure 6:
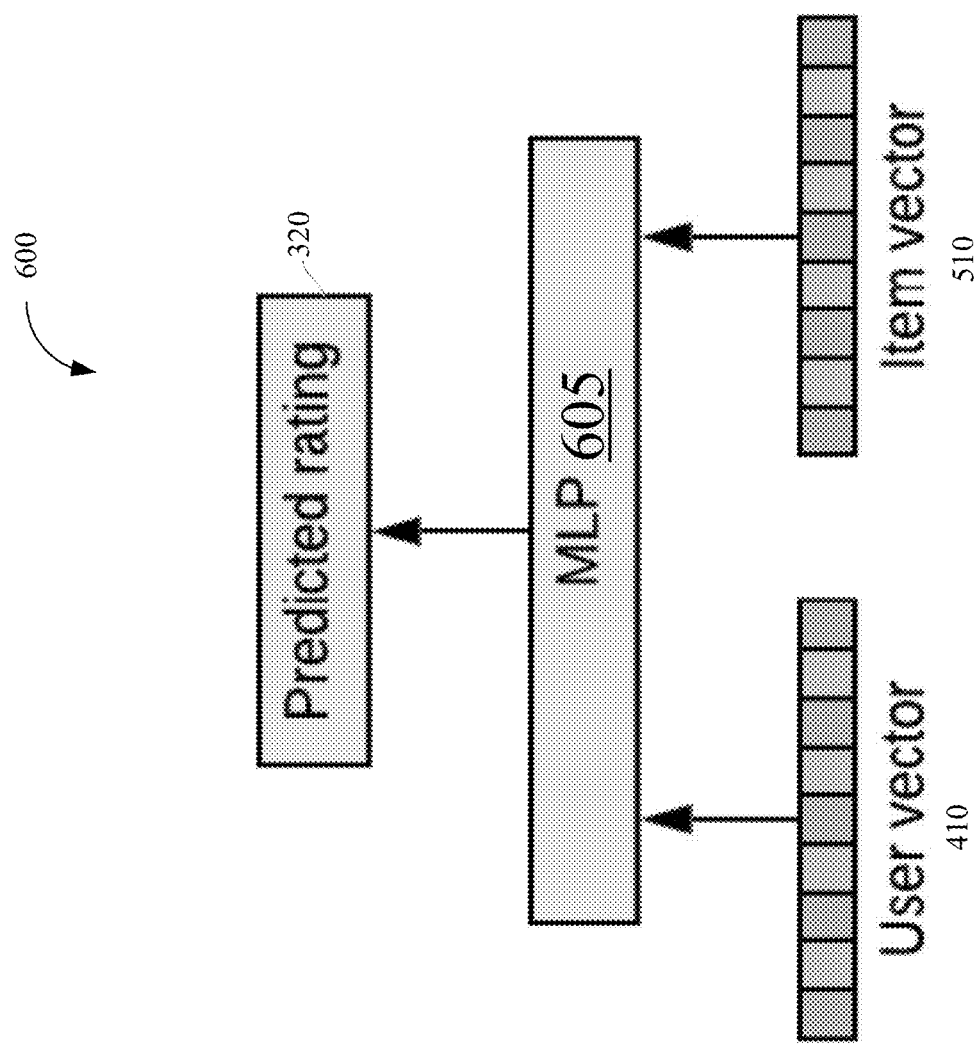

FIGS. 4-6 are simplified diagrams of machine learning architectures 400-600 of a relevance model, according to some embodiments. FIG. 4 is a simplified diagram for generating a user vector that models user representations, FIG. 5 is a simplified diagram for generating an item vector that models item representations, and FIG. 6 is a simplified diagram of an output layer that combines the user vector and the item vector into a predicted rating or score 320.

As discussed above, architecture 400 generates a user vector 410. The user vector 410 includes user representation and is generated from input features 315, including categorical features 415, multi-group categorical features 420, continuous-valued features 425, and/or the user installation history 430. As discussed above, input features 315 may be stored as embeddings, including categorical embeddings vectors, continuous embeddings vectors, user history embeddings vectors, etc.

In some embodiments, single-group categorical feature embeddings may be generated from categorical features 415. The single-group categorical feature embeddings may be concatenated together using a concatenation module 440 into a concatenated categorical feature embeddings 445.

In some embodiments, the multi-group categorical feature embeddings may be generated from each multi-group categorical feature in features 420. The multi-group categorical feature embeddings for each multi-group categorical feature may be average-pooled using one or more average pooling modules 450 into average pooled multi-group categorical feature embeddings 455. The average pooling module 450 determines an average pooled multi-group categorical feature embeddings 455 by determining an average of multi-group categorical feature embeddings determined from each multi-categorical feature in features 420.

In some embodiments, user installation history 430 may include multiple items 460 that the user has previously downloaded or evaluated. One or more attention modules 470 may be applied to learn the similarity between the embeddings for a candidate item 465 (which may be a candidate recommended item) and embeddings for items 460 in user installation history 430. The attention module 470 may receive the candidate item 465 (which may be represented by a candidate item identifier), embeddings for one of the installed items 460 and an element-wise product 475 of the embeddings for the candidate item 465 and the embeddings for one of the installed items 460. Attention module 470 may include a concatenation module 480 and multi-layer perception (MPL) neural network 485. The concatenation module 480 may concatenate the embeddings for the candidate item 460, embeddings for one of the installed items 465, and the element-wise product 475 of the embeddings for the candidate item 460 and the embeddings for one of the installed item 465 into a concatenation vector and then pass the concatenated vector as input into the MLP neural network 485. The MLP neural network 485 may include a sigmoid function and may use the sigmoid function to generate an item representation 490.

In some embodiments, an element-wise product 492 may be generated from the embeddings of each item in items 460 and the corresponding item representation 490 that is an output of attention module 470. The element-wise products 492 may be an input to an average pooling module 494 (which may be the same or different average pooling module as average pooling module(s) 450) which generates the history representation 496 as the weighted average pooling of element-wise products 492 for different items 460 based on the attention weights.

In some embodiments, the user vector 410 may be generated by combining the embeddings for the continuous features 425, concatenated categorical feature embeddings 445, average pooled multi-group categorical feature embeddings 455, and history representation 496.

In some embodiments, FIG. 5 is a diagram of a machine-learning architecture 500 that generates an item vector 510. The input into architecture 500 may be an item identifier 505 that identifies an item and a corresponding item name 515 from input features 315. Item name 515 may include one or more words 507. The output of architecture 500 may be the item vector 510.

In some embodiments, architecture 500 may include a linear classifier 520. Linear classifier 520 may highlight the keywords in an item name 515 by applying larger weights 512 to words such as "Sales" or "Dashboard" and de-emphasize smaller words by applying smaller weights 512 to words such as "and" or "with." Suppose that item name 515 has n words 507 with corresponding embeddings $\{e_1, e_2, \ldots, e_n\}$ and $\beta$ the linear classifier 520. Then, the importance weight for word i may be given by:

$$w_i = \frac{\exp(\beta^\top e_i)}{\sum_{j=1}^{n} \exp(\beta^\top e_j)} \quad \text{Eq. (2)}$$

In some embodiments, a representation 525 may be generated for each word in words 507 from the embeddings for each word and the corresponding weight. The weighted average 530 of the item name 515 may be the weighted sum of the representations 525 pooled according to weight w (e.g., $e = \sum_{i=1}^{n} w_i e_i$).

In some embodiments, architecture 500 may generate the item vector 510 by concatenating the weighted average 530 of the words 507 in the item name 515 with the item identifier 505.

In some embodiments, FIG. 6 is diagram is a machine learning architecture 600 that generates predicted score 320 in relevance model 305, according to some embodiments. Architecture 600 includes an MLP 605 that generates a sigmoid output. The input to MLP 605 are the user vector 410 generated in FIG. 4 and item vector 510 generated in FIG. 5. The output of MLP 605 is predicted score 320.

Figure 7:
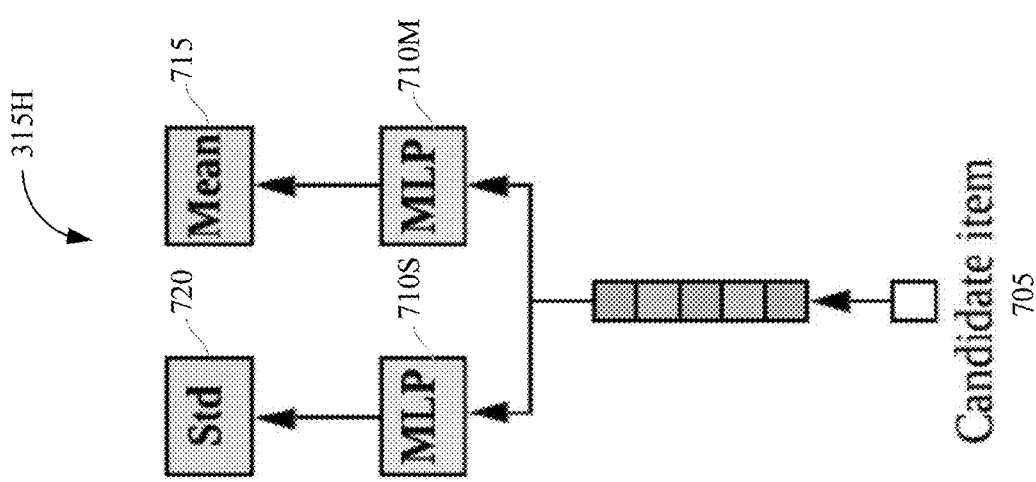
FIGS. 7-9 are simplified machine learning diagrams of architectures of a diversity and explainability models, according to some embodiments.
Figure 8:
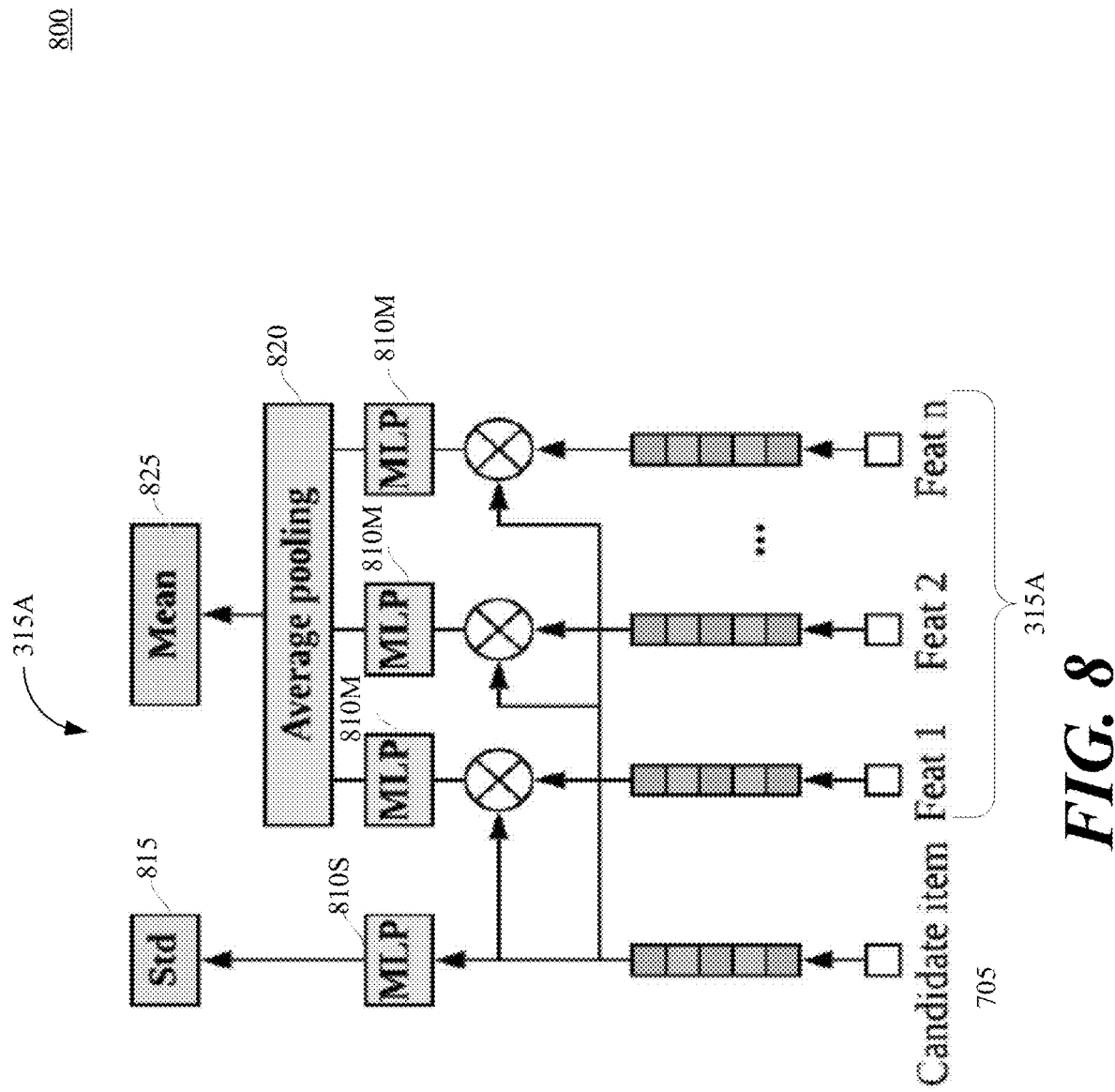
Figure 9:
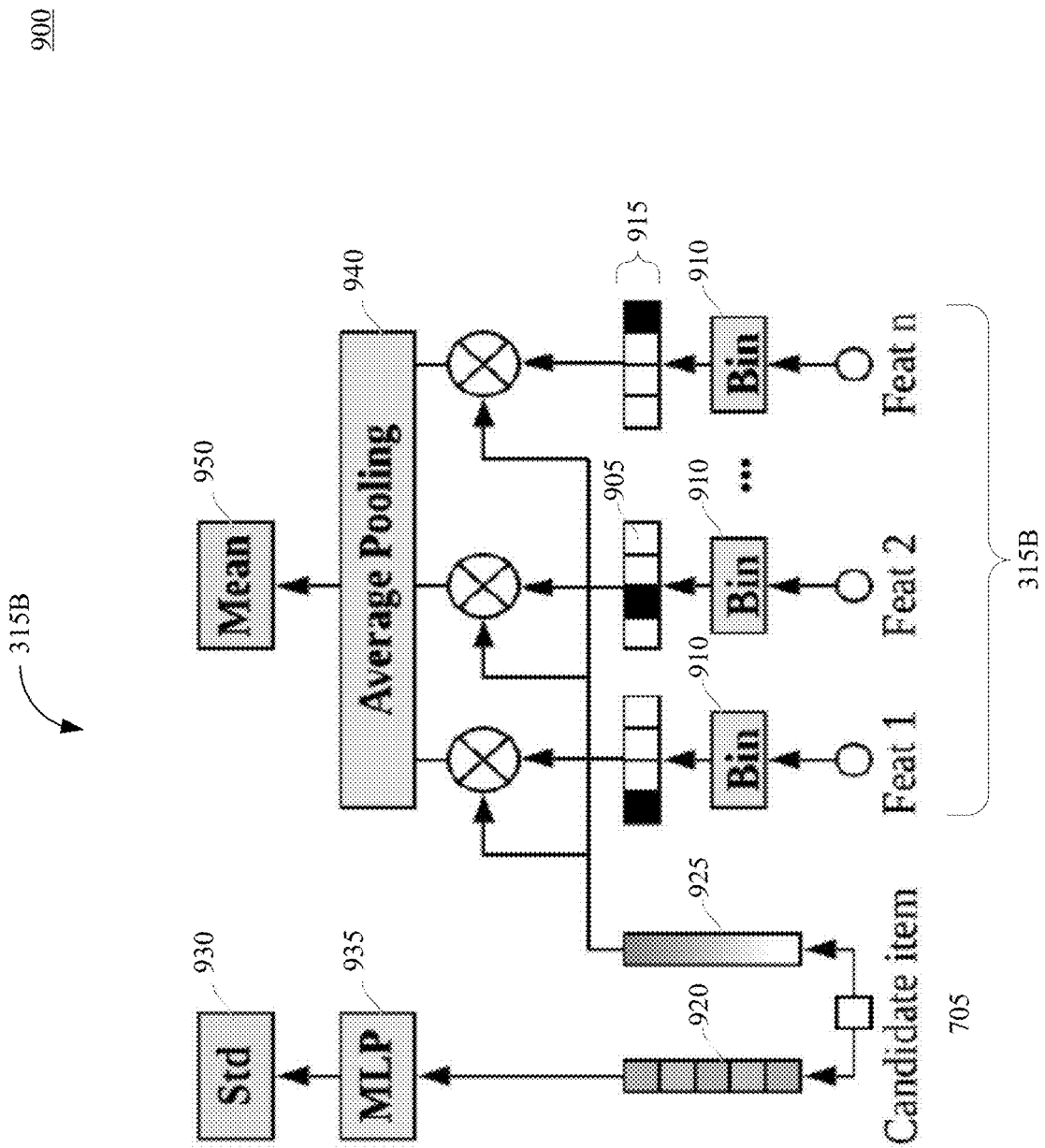

FIGS. 7-9 are simplified diagrams 700-900 of diversity and explainability models, according to some embodiments. FIG. 7 is a simplified diagram 700 of a diversity and explainability model for hot items, according to some embodiments. FIG. 8 is a simplified diagram 800 of a diversity and explainability model for categorical items, according to some embodiments. FIG. 9 is a simplified diagram of a diversity and explainability model for continuous-valued features, according to some embodiments.

With reference to FIGS. 7-9, DAE models 310 may utilize P and D distributions. The distributions allow for the loss function of Equation 1 to be optimized and for DAE models 310 generate reasonable expectations for the recommendations. The predefined distribution P may be the Gaussian distribution N (v, $\gamma^2$I), where v=0.5 and $\gamma$ is a constant.

Distribution D may be defined as D(i, j) given user i and item j is a Gaussian distribution N ($\mu$, $\sigma^2$), where mean $\mu$ is a function of user i and item j while the standard distribution a depends on item j only. The reason why the standard distribution a may depend on item features is that variance $\sigma^2$ models intrinsic "popular" properties for items. Accordingly, unpopular items have relatively low number of interactions among users, leading to small variances. On the other hand, popular items have various ratings among users according to different user preferences, leading to large variances. Using distributions P and D as defined above, the loss function of Equation 1 may be reformulated as:

$$L = \frac{1}{|S|} \sum_{(i,j) \in S} \left[ \log_{loss}(p(i,j), y_{ij}) + \frac{1}{K} \sum_{k=1}^{K} D_{KL}(N(v, \gamma^2) \| N_k(p(i,j) + \mu(i,j), \sigma(j)^2)) \right], \quad \text{Eq.(3)}$$

where, p (i, j) is the predicted score 320 generated by the relevance model 305.

In some embodiments, the DAE models 310 may allow one or more users to control recommendation diversity in real-time for exploring new applications. The framework of the subject technology provides a convenient way to satisfy this requirement. In prediction, the predicted rating r(i, j) of user i for item j is given by:

$$r(i,j) = p(i,j) + w * q(i,j), q(i,j) \sim N(\mu(i,j), \sigma(j)^2), \quad \text{Eq. (4)}$$

where w∈ [0, 1] controls the trade-off between diversity and offline accuracy, e.g., larger w means doing more exploration for new items. Distribution N($\mu$(i, j), $\sigma$(j)$^2$) may be a mixture of Nk($\mu$ (i, j) and $\sigma$(j)$^2$). This may be an average or one of Nk($\mu$(i, j) and $\sigma$(j)$^2$). In another embodiment, DAE models 310 may use the average mixture of Nk($\mu$(i, j) and $\sigma$(j)$^2$.

In some embodiments, DAE models 310 may indicate reasons for why a particular application may be recommended instead of simply presenting the recommendation results to one or more users. For example, suppose that D(i, j)=$\mu$(i, j) instead of a Gaussian distribution. Then, the diversity term in Equation 3 reduces to (p(i, j)+$\mu$(i, j)–0.5)$^2$, meaning that the DAE models 310 may try to approximate the predictions of the relevance model 305, such as approximation of 0.5–p (i, j). Therefore, it can be viewed as a model-agnostic explainable recommendation approach by training a simpler model for explanation. In some aspects, the DAE models 310 may need to know the types of features the relevance model 305 utilizes for generating proper explanations.

In some embodiments, one or more features and/or relevant installed native applications may be highlighted to indicate whether the recommended applications are reasonable or not. Different DAE models 310 may highlight different features. For example, hot DAE model discussed in FIG. 7 may be used for extracting popular items. Categorical DAE model 310A discussed in FIG. 8 may be used for highlighting categorical features, multi-group categorical features and user installation history. Continuous DAE model 310B discussed in FIG. 9 may be used for highlighting continuous-valued features.

As illustrated in FIG. 7, the input to hot DAE model 310H may be a candidate item ID 705. Candidate item ID 705 may be an identifier of an item which is a recommendation candidate. The hot DAE model 310H includes two MLPs 710, MLP 710M that determines a mean $\mu$ 715 and MLP 710S that determines the standard deviation $\sigma$ 720. Candidate item ID 705 may be converted into a candidate item embedding using an embedder (not shown). In an embodiment where $e_c$ is the candidate item embedding, the output of hot DAE model 315H may be the mean $\mu$ 715 and standard deviation $\sigma$ 720, where mean $\mu$ and standard deviation $\sigma$ are defined by:

$$\mu = 0.5 - \text{sigmoid}(MLPm(e_c)), \sigma = \text{sigmoid}(MLPs(e_c)), \quad \text{Eq. (5)}$$

where MLPm and MLPs are MLP 710M and MLP710S. For convenience, mean $\mu$ in Equation 5 may have an offset term 0.5 since the mean of the predefined distribution P may be 0.5. Given the candidate item ID 705, the hot DAE model 310H may compute its popularity score $s_{hot}$=sigmoid (MLPm($e_c$)). By sorting popularity scores generated for different items, the hot DAE model 310H may obtain a list of hot items. The list may include the items above a certain threshold or the top n number of items. Then, hot DAE model 310H may provide an explanation that "item X is recommended because it is popular" if item X is in the hot item list. In such a case, the popularity score may be regarded as an explainability score in that the explanation for selecting the item depends entirely upon its popularity.

As illustrated in FIG. 8, the categorical DAE model 310A may receive the candidate item ID 705 (or embeddings for the candidate item ID 705) and the user categorical features 315A (or embeddings of the categorical features) from input features 315. In some embodiments, the user installation history may also be viewed as user categorical features 315A. The candidate item ID 705 may be passed through MLP 810s that determines the standard deviation $\sigma$ 815. Each feature in categorical features 315A and candidate item ID 705 may be passed through MLPs 810M that determines the importance weight for each feature in categorical features 315A. The importance weights for each combination may then be average pooled using the average pooling module 820 to determine the mean $\mu$ 825.

Suppose $e_c$ is the candidate item identifier's embedding and $e_i$ is the embedding of the $i^{th}$ candidate categorical feature 315A, then the mean $\mu$ 825 and the standard deviation $\sigma$ 815 may be defined as:

$$\mu = 0.5 - \text{sigmoid}\left(\frac{1}{n}\sum_{i=1}^{n} MLP_m(e_c \odot e_i)\right), \sigma = \text{sigmoid } (MLP_s(e_c)), \quad \text{Eq. (6)}$$

Here, $\odot$ is the element-wise product and MLPm and MLPs are MLP 810M and MLP 810S. Score $s_{cate}$=MLPm($e_c \odot e_i$) is the $i^{th}$ candidate feature's importance weight, which may be referred to as an explainability score or metric and may be used for explanation. The candidate categorical features 315A may be sorted by the score $s_{cate}$ and the top k candidate features may be selected for explanation. The distribution of scores $s_{cate}$ associated with the top k features may be referred to as a distribution of explainability scores or metrics. Then the explanation may be "item X is recommended because of features a, b, k." For example, "application (RingLead Field Trip—Discover Unused Fields and Analyze Data Quality) may be recommended because: 1) the target user is in USA, 2) the market segment is ESMB and 3) the item is on the sales and custom cloud." Based on this type of an explanation, the recommended applications may be verified as a reasonable or unreasonable application by one or more users.

As illustrated in FIG. 9, the continuous DAE model 310B may receive candidate item ID 705 and continuous-valued features 315B (or their embedding). Each feature in the continuous-valued features 315B may be discretized and converted into one-hot vectors 905 using bins 910. These one-hot vectors 905 may then be concatenated to form an n×B multi-hot vector v 915 for each continuous feature 315B, where n is the number of continuous-valued features and B is the number of bins 910. The candidate item ID 705 may be mapped into two vectors 920 and 925. Vector 920 may be for modeling standard deviation σ 930 using MLP 935. Vector 925 may be the regression coefficient α∈RnB for modeling mean μ 950 using the multi-hot vectors v 915 and average pooling module 950.

In some aspects, mean μ 950 and standard deviation σ 930 may be given by the following equations:

$$\mu = 0.5 - \text{sigmoid}\left(\frac{1}{n}\alpha^T v\right), \sigma = \text{sigmoid}(MLP(e_c)) \quad \text{Eq. (7)}$$

where the coefficient α may be used for feature-based explanation. For example, the feature importance weight for the $i^{th}$ continuous-valued feature is $s_{cont}=\alpha(i, k)$, where k is the index of the bin 910 that this feature belongs to. The scores $s_{cont}$ may be referred to as explainability scores or metrics and may be used for the explanation. By sorting the scores $s_{cont}$, continuous DAE model 310B may generate similar feature-based explanations for the continuous-valued features. That is, the features may be sorted by the score $s_{cont}$ and the top k features may be selected for explanation. The distribution of scores $s_{cont}$ associated with the top k features may be referred to as a distribution of the explainability scores or metrics.

Figure 10:
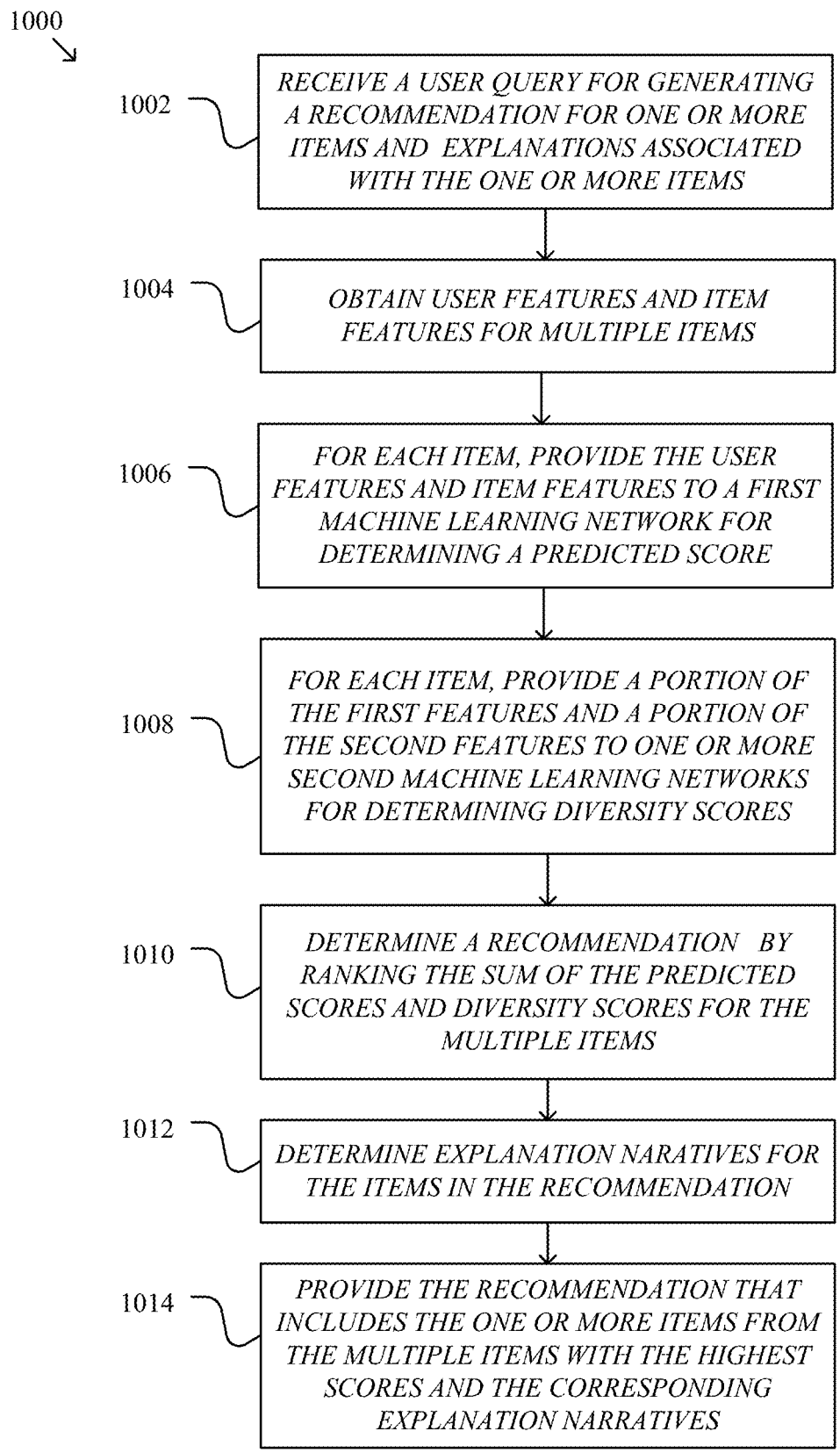
FIG. 10 is a simplified flow diagram of an example process for generating recommendations, according to some embodiments.

FIG. 10 is a simplified flowchart 1000 of a method for generating recommendations with a machine learning recommendation system, according to some embodiments. Operations of FIG. 1000 may be implemented, at least in part, in the form of executable code stored on non-transitory, tangible, machine-readable media that when run by one or more processors may cause the one or more processors to perform one or more of the operations 1002-1012. In various embodiments, the operations of FIG. 10 may be implemented as software instructions executed by one or more logic devices associated with corresponding electronic devices and/or structures depicted in FIGS. 1-9.

At operation 1002, a query is received. For example, recommendation module 130 receives input 140 which may be a user query for generating a recommendation that includes one or more items with an explanation narrative associated with each item in the recommendation. As discussed above, an item may be an application.

At operation 1004, one or more input features are obtained. As discussed above, input features 315 may be user features that include user history, item features, categorial features, continuous features, etc. Input features 315 may be obtained from applications information and user information stored in the user repository 205 and application repository 210 that are coupled to recommendation module 130.

At operation 1006, a predicted score is determined. For example, relevance model 305 may receive the input features 315, and use one or more neural network models discussed in FIGS. 4-6 to generate predicted score 320 and accuracy loss 345.

At operation 1008, diversity scores are determined. For example, DAE models 310 may determine distributions 325. For example, categorical DAE model 310A that may receive categorical features 315A and determine distribution 325A, continuous DAE model 310B may receive continuous features 315B and determine distribution 325B, and hot DAE model 310H may receive candidate item identifier from input features 315 and determine the hot distribution. From the distributions 325, recommendation module 130 may determine diversity scores 330 for an item.

Notably, operations 1004-1008 may occur for each item multiple items that may be recommended in response to the user query received in operation 1002.

At operation 1010, a recommendation is determined. For example, recommendation module 130 may determine a sum of the predicted score 320 and diversity score for multiple items. Recommendation module 130 may then rank the combined score from the highest score to the lowest score and select an item that corresponds to the highest score or item(s) that corresponds to the top k scores as the recommended item(s).

At operation 1012, explanation narratives are determined using one or more neural networks. For example, the categorical DAE model 310A, continuous DAE model 310B, and hot DAE model 310H may generate explainability scores in addition to distribution 325. Using the explanation scores, DAE model 130 may generate explanation, such as explanation 322A or 322B for the items recommended in operation 1010.

At operation 1014, a recommendation is provided. For example, recommendation module 130 may provide a recommendation to the user that includes an item that corresponds to the highest score, or items that correspond to the top k scores and the explanation narratives that correspond to the item(s).

In some embodiments, recommendation module 130 may be applied to recommending movies to one or more users. For illustrative purposes, suppose the MovieLens 1M dataset includes data containing 6040 users, 3883 movies and 1,000,000 ratings. The MovieLens dataset may be transformed into a binary classification dataset to make it suitable for the recommendation task with implicit feedback. Original user ratings of the movies may be ranging from 0 to 5. The samples with rating of 4 and 5 may be labeled as positive examples. The data may also be segmented into training and test datasets based on user rating history in a leave-one-out way. For example, for each user, the movies the user rated may be sorted by the timestamp in ascending order. Then the last movie may be included in the test dataset and the rest of the movies may be included in the training dataset.

In other embodiments, recommendation module 130 may be applied to recommending applications to one or more users. The application recommendation dataset may include 170,000 users, 7,000 applications, and 1,400,000 installation records. The user information may include three types of features: 1) categorical features, e.g., country, city, market segment, 2) multi-group categorical features, e.g., industry, topics, and 3) continuous-valued features, e.g., cloud usage. The application information may include the application names and application identifiers. The records from different time periods may also be allocated to the training and test datasets. For example, the installation records from 2018-01 to 2018-12 (year-month) may be included in the training dataset and the installation records from 2019-01 to 2019-02 may be included in the test dataset. The training dataset may be used for offline evaluation.

For the MovieLens dataset, the relevance model 305 may be a feedforward neural network that receives input 140 that may be user and movie identifiers and user categorical features. Relevance model 305 may include four hidden layers with sizes [64, 32, 16, 8]. The DAE models 310 may be hot DAE model 310H, categorical DAE model 310A and continuous DAE model 310B discussed in FIGS. 4-6 and may be used to improve diversity and provide explanations such as "movie X is recommended to user A because either A has features P and Q or X is a hot movie."

For the application recommendation dataset, the relevance model 305 may include a concatenated user vector and item vector and may feed the result to a MLP layer (with sizes [50, 50]) to compute the predicted score 320. The attention module 470 may include a dense layer to compute the attention weights. Relevance model 305 may use a PReLUs as the activation functions. The embedding sizes for words, categorical features, and item IDs may be 16. The DAE models 310 may be categorical DAE model 310A and continuous DAE model 310B. The MLPs in the relevance model 305 and DAE models 310 may include one dense layer, 5 bins, and an embedding size of 8. In some instances, an optimizer may have a learning rate $1e^{-3}$ and have a batch size 512. The relevance model 305 and the DAE models 310 may be trained together by minimizing the loss function described in Equation 2, that is by minimizing total loss 340. For each user, the candidate items in prediction may be items except for items that have already been installed, and the top 10 predicted items may be the items that have been recommended. For diversity, the aggregate diversity of recommendations may be considered across all users.

The relevance model 305 is compared with a logistic regression (LR) model, wide and deep model, and DIN model on the application recommendation dataset discussed above. The metrics for accuracy include a hit ratio and NDCG. Table 1, below, illustrates the comparison results, where "@ k" means k items were recommended for each user. Table 1 illustrates that the deep learning-based models outperformed the LR model. The DIN model and the relevance model 305 obtained better performance than the wide & deep model, which demonstrates the importance of utilizing user installation history in the recommendation task. The relevance model 305 also performs better than the DIN model in terms of hit ratio and NDCG @ 10. In comparison with the DIN model, the relevance model 305 had a special module for learning item representation and the experimental results verified its effectiveness.

TABLE 1

Comparison on the application recommendation dataset.

| Metric | LR | Wide & Deep | DIN | Relevance Model 305 |
|---|---|---|---|---|
| Hit Ratio @ 6 | 0.2434 | 0.2912 | 0.2936 | 0.2974 |
| NDCG @ 6 | 0.2385 | 0.2563 | 0.2671 | 0.2669 |
| Hit Ratio @ 10 | 0.3082 | 0.3518 | 0.3530 | 0.3567 |
| NDCG @ 10 | 0.2598 | 0.2765 | 0.2856 | 0.2868 |

The experiment below evaluates the ability for controlling diversity with the recommendation module 130. This allows for recommendation diversity because recommendation module 130, once trained, may identify new applications and not only popular applications. Accordingly, the DAE models 310 may be compared with different re-ranking methods. The aggregate diversity may be measured by two metrics. The first metric includes the number of the unique recommended items among all the users. The second metric includes the average distance between the recommendation results of two different users. More formally, let r(i) be the set of the recommended items for user i (suppose that |r(i)|=k) and U be the set of user pairs (i, j), then the metric may be defined by:

$$\text{avg\_dist} = \frac{1}{2k|U|} \sum_{(i,j) \in U} |r(i) \cup r(j)| - |r(i) \cap r(j)| \quad \text{Eq. (8)}$$

where r(i)=k, avg_dist was in the set [0, 1], e.g., avg_dist=1 if r (i)∩r(j)=∅ for all i, j. The re-ranking methods compared with the approach described herein are as follows: given user i and item j, let p(i, j) be the corresponding predicted rating and rank (i, j) be the rank of item j for user i. For a certain threshold T, the re-ranking function is defined by rerank (i, j)=h(i, j) if p(i, j)>T; rank (i,)+z(i) otherwise, where z(i)=max j |p (i, j)>T h(i, j). With different functions h(i, j), different approaches may be used for improving diversity. Three functions were considered: 1) reverse predicted rating (RPR), i.e., items were sorted based on the predicted ratings from lowest to highest, 2) reverse click/installation counts (RCC), i.e., items were sorted based on the total click/installation times from lowest to highest, and 3) 5D ranking, which is aimed to improve diversity by considering "recommendations" as resources to be allocated to the items and computing a score named 5D-score for each user/item pair. The diversity is controlled by tuning threshold T. The DAE models 310 control diversity using w of Equation 3. FIGS. 11A-B and 12A-B include charts that illustrate a comparison between the recommendation module 130 and the alternative re-ranking methods mentioned above. The x-axis is the number of the unique recommended items or the average distance between the recommendation results of two users. The y-axis is the hit ratio. These figures show the trade-off between the diversity and the offline accuracy.

Figure 11A:
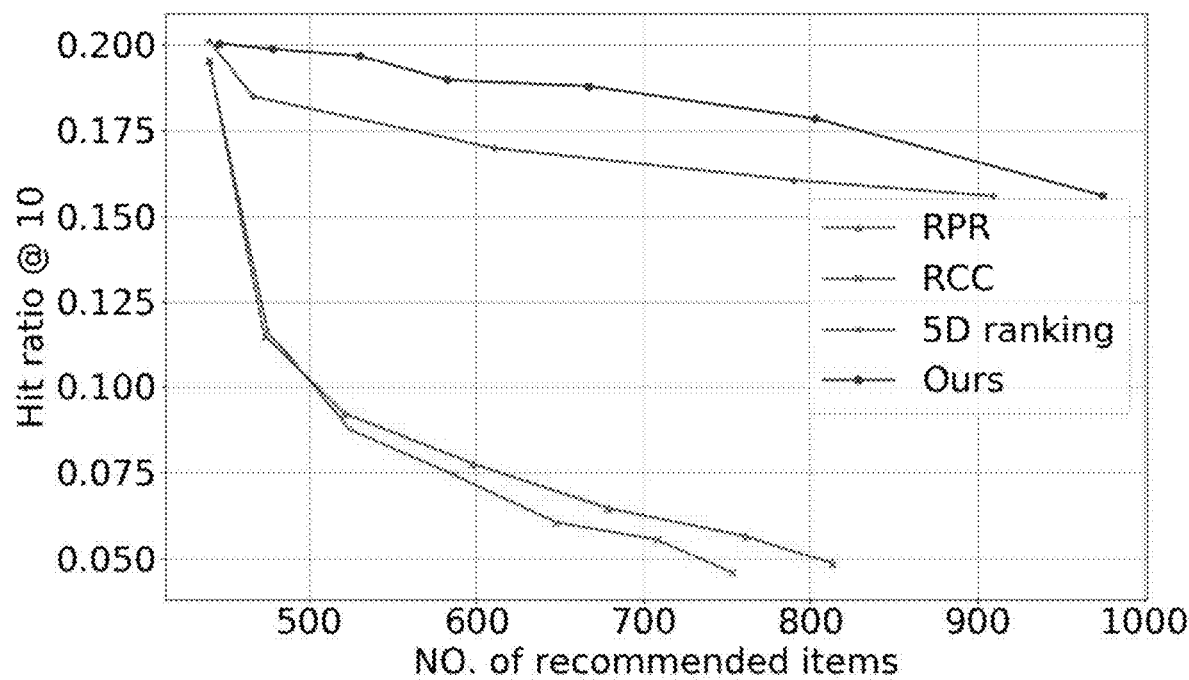
FIGS. 11A and 11B include charts that illustrate comparisons between the recommendations provided by a recommendation module and conventional recommendation models using a MovieLens dataset, according to some embodiments.
Figure 11B:
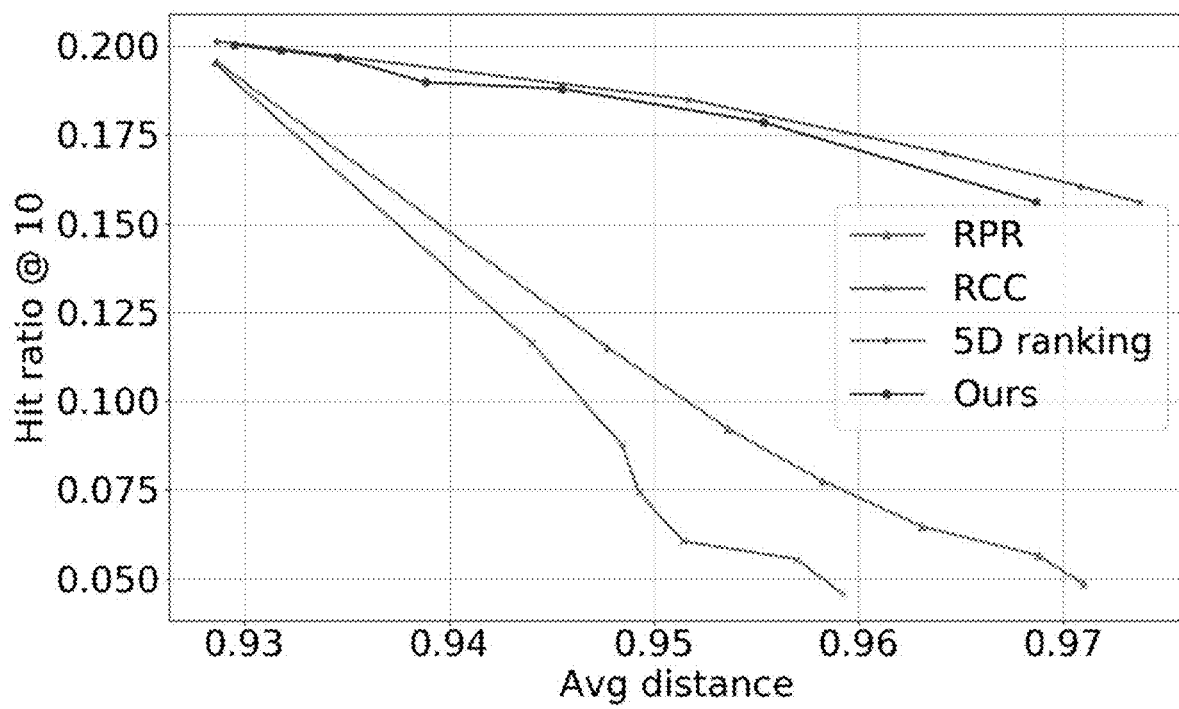

As illustrated in FIGS. 11A and 11B, for the MovieLens dataset, the DAE models 310 performed better than the reverse predictive rating (RPR) and reverse click/installation counts (RCC) models. For instance, the recommendation module 130 recommended about 800 items with the hit ratio 0.18, while the hit ratios of RPR and RCC dropped to 0.06 if 800 items were recommended. Recommendation module 130 also beat the 5D ranking in terms of the number of the recommended items and has a similar performance with the 5D ranking in terms of the average distance. Notably, the 5D ranking method requires solving a non-convex optimization problem to compute allocation for items and consumed a lot of memory for computing 5D scores, especially when the number of users or items was large (dealing with an n×m matrix where n and m were the numbers of users and items respectively), while the recommendation module 130 is more efficient due to only computing the forward propagation of the neural networks.

Figure 12A:
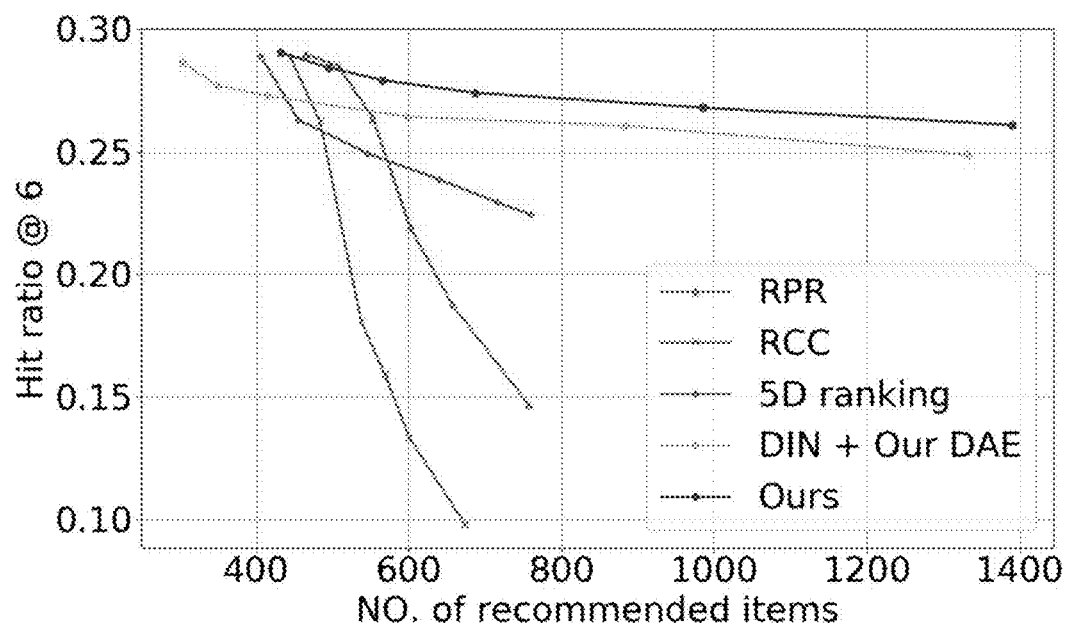
FIGS. 12A and 12B include charts that illustrate a comparison between the recommendations provided by a recommendation module and conventional recommendation models using an application recommendation dataset, according to some embodiments.
Figure 12B:
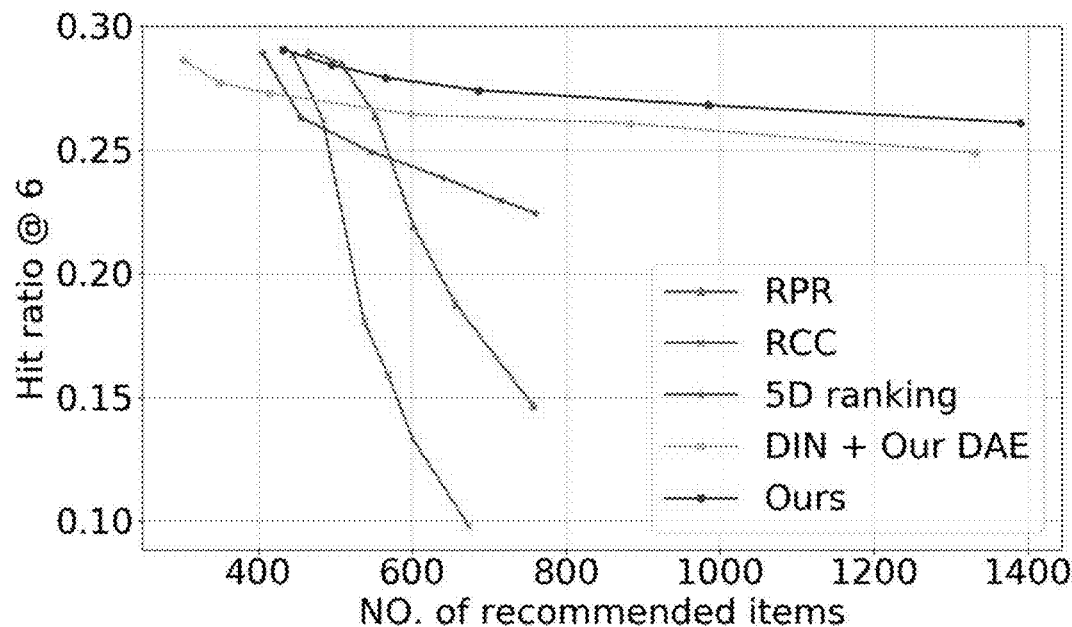

As illustrated in FIGS. 12A and 12B, for the application recommendation dataset, the recommendation module 130 performs better than the re-ranking methods when generating recommendations. For example, the recommendation module 130 may recommend approximately 1000 items without reducing the hit ratio, while the re-ranking methods recommend approximately 800 items at most with a certain level of accuracy (e.g., hit ratio @ 10>0.2). Additional experiments also used a DIN and DAE model 310 combination, where the DIN model replaced the relevance model 305. This demonstrates that the recommendation module 130 may support recommendation models other than the relevance model 30 and that the relevance model 305 outperforms the DIN model with the application recommendation dataset in terms of accuracy and diversity.

Table 2, below, illustrates the performance of the recommendation module 130 when the parameter w that is used to control diversity varies from 0.1 to 0.4. As illustrated in Table 2, the aggregate diversity can increase substantially without losing significant offline accuracy.

TABLE 2

Offline accuracy-diversity tradeoff for recommendation module 130 using the application recommendation dataset

| Parameter w | 0.1 | 0.2 | 0.3 | 0.4 |
|---|---|---|---|---|
| Hit ratio @ 6 | 0.2905 | 0.2844 | 0.2740 | 0.2609 |
| NDCG @ 6 | 0.2605 | 0.2521 | 0.2412 | 0.2260 |
| Hit ratio @ 10 | 0.3508 | 0.3416 | 0.3306 | 0.3175 |
| NDCG @ 10 | 0.2807 | 0.2712 | 0.2608 | 0.2460 |
| # recommended items | 433 | 495 | 687 | 1390 |
| Avg. distance | 0.7452 | 0.7711 | 0.7993 | 0.8280 |

Notably, novel items can be recommended by the recommendation module 130 by adjusting parameter w in real-time without retraining the entire recommendation module 130. Therefore, recommendation model 130 may identify new items or applications that may be recommended or sold to users.

As discussed above, the DAE models 310 generate an explanation that corresponds to a recommended item. The hot DAE model 310H may be applied to construct a list of popular movies and provide explanations such as "movie X is recommended because it is quite popular" when movie X is in the hot list of movies. Table 3, below, illustrates the top ten movies recommended by the hot DAE model 310H. The movies listed in Table 3 appear to be popular among most age groups. The categorical DAE model 310A may be applied to compute feature importance and provide explanations such as "movie X is recommended to user A because A has features P and Q". The user features may include age, gender, occupation, and five preferred genres or topics.

TABLE 3

Popular movies extracted by the model described herein

| Rank | Movie |
|---|---|
| 1 | American Beauty |
| 2 | Star Wars: Episode IV—A New Hope |
| 3 | The Silence of the Lambs |
| 4 | The Godfather |
| 5 | Saving Private Ryan |

TABLE 3-continued

Popular movies extracted by the model described herein

| Rank | Movie |
|---|---|
| 6 | Shawshank Redemption |
| 7 | Pulp Fiction |
| 8 | Fargo |
| 9 | Star Wars: Episode VI—Return of the Jedi |
| 10 | Terminator 2: Judgment Day |

Table 4 illustrates three items recommended by relevance model 305 and the items' feature importance scores computed by the hot DAE model 310H. From the popular movie list and the feature importance scores, the hot DAE model 310H is able to provide some explanations, such as that "Planet of the Apes" and "Star Trek VI" were recommended because this user prefers "Action" and "Sci-Fi" movies, while "American Beauty" was recommended because the user is a male at age 45 and interested in "Drama" movies and this movie is popular.

TABLE 4

Feature importance scores for recommended items for an exemplary user

| Movie | Age: 45 | Gender: Male | Occupation Executive/Managerial | Topic 0 Action | Topic 1 Sci-Fi | Topic 2 Drama | Topic 3 Adventure | Topic 4 Horror |
|---|---|---|---|---|---|---|---|---|
| Planet of the Apes | 0.34992 | 0.70140 | 0.60264 | 0.99939 | 0.87274 | 0.84117 | 0.75280 | 0.27374 |
| American Beauty | 0.94194 | 0.98621 | 0.87074 | 0.01474 | 0.38204 | 0.98042 | 0.33694 | 0.01333 |
| Star Trek VI | 0.13612 | 0.30197 | 0.54996 | 0.99992 | 0.93374 | 0.53731 | 0.84779 | 0.65787 |

A survey of 50 results were sampled, asking "Is Explanation A better than Explanation B?" with rating scale 1-5. Explanation A was generated by recommendation module 130 and explanation B was generated by the conventional LIME method. The average rating was 3.29 with variance 1.08, meaning that the recommendation module 130 is comparable to LIME method. The explanation has a template "application X is recommended because of features A, B, etc." Table 5 and Table 6, below, list the top ten categorical features learned by the recommendation module 130 and compare them with the results obtained from the LIME method.

TABLE 5

Feature-level explanation for "App name: RingLead Field Trip-Discover Unused Fields and Analyze Data Quality"

| Rank | Recommendation Module | LIME |
|---|---|---|
| 1 | ORGTYP = UE | AOVBAND = 200-600k |
| 2 | MKT_SEGMENT = ESMB | ORGTYP = UE |
| 3 | ACCT_OWN_ID = xxxxx | SUBREGION = USA |
| 4 | AOVBAND = 200-600k | ADOPTION_STAGE = assessment |
| 5 | SUBREGION = USA | CLOUD = sales and custom |
| 6 | CLOUD = sales and custom | STATUS_DW = active |

TABLE 5-continued

Feature-level explanation for "App name: RingLead Field Trip-Discover Unused Fields and Analyze Data Quality"

| Rank | Recommendation Module | LIME |
|---|---|---|
| 7 | STATE_NM = NY | COUNTRY_NM = United States |
| 8 | TOP_CITY = New York | TOP_CITY = New York |
| 9 | STATUS_DW = active | CITY_NM = New York |
| 10 | REGION = AMER | REGION = AMER |

TABLE 6

Feature-level explanation for "App name: 今日から使えるサクセスダッシュボード"

| Rank | Recommendation Module | LIME |
|---|---|---|
| 1 | TOP_CITY = Tokyo | SUBREGION = Japan |
| 2 | CLOUD = service | ACTT_OWN_ID = xxxxxx |
| 3 | STATE_NM =東京都 | USR_ROLE_ID = yyyyy |
| 4 | ADOPTION_STAGE = adoption | REGION = JP |
| 5 | STATUS_DW = active | CITY_NM =品川区 |
| 6 | CITY_NM =品川区 | TOP_CITY = Tokyo |
| 7 | COUNTRY_NM = Japan | COUNTRY_NM = Japan |
| 8 | INVSTOR_RELT_CD = small | STATE_NM =東京都 |
| 9 | USR_ROLE_ID = yyyyy | INVSTOR_RELT_CD = small |
| 10 | ORGTYP = EE | ORGTYP = EE |

From the examples in Tables 5 and 6, it is evident that many important features, such as CITY, COUNTRY, REGION, ORGTYP, extracted by the recommendation module 130 and by the LIME method are the same. For the example in Table 5, the recommendation module 130 highlights the market segment and the account ID which are reasonable for this case. For the second example in Table 6, the recommendation module 130 highlights the cloud service type and the adoption stage, while the LIME method does not find them. In the examples in Table 5 and Table 6, the LIME method tends to extract features related to locations, while the important features extracted by the method described herein were more diverse.

The recommendation module 130 may also be compared with the LIME method in a quantitative way. For each user/item pair (i, j) in the recommendation results, let $S_o(i, j)$ be the set of the top ten important features generated by the recommendation module 130 and $S_l(i, j)$ be the set of the top ten important features (positive features only) obtained by the LIME method. Then, the metric may be defined as:

$$\text{explaination\_distance} = \frac{1}{10|R|} \sum_{i,j \in R} |S_o(i, j) \cap S_l(i, j)|, \quad \text{Eq. (9)}$$

Note that the LIME method is a model-agnostic method for generating explanations, requiring training of a local linear model for each user and item pair. The LIME method uses more computational resources and leads to a high response latency, which is not suitable for a requirement that the system should allow users to tune the diversity and obtain the explanation in real-time. The recommendation module 130 does not use additional training in its prediction. The running time when generating explanations for categorical features and continuous-valued features is compared for 170,000 users with ten recommended applications for each user. The experiment is conducted on a machine with a 3 GHz 32-cores CPU and 32 GB memory. The running time for the LIME method is 23 hours (487.1 ms per user) while the running time for the recommendation module 130 is 0.6 hours (12.7 ms per user).

Besides the feature-level explanation, the categorical DAE model 310A may also be used to generate item-based explanation, such as "application X is recommended because this user installed applications Y and Z," by replacing the input features with the installed items. FIG. 10 shows an example of this kind of explanation. For example, an application "Mass Edit+Mass Update+Mass Delete" may be recommended because the user has already installed applications "Free Blog Core Application" and "Conga Composer". The "Mass Edit+Mass Update+Mass Delete" is a developer tool for searching and mass editing multiple accounts, contacts and custom objects, which is may be used in cloud-based applications such as "Free blog" and "Conga Composer" which use and create documents and contracts. The item-based explanation can be applied to mine some hidden relationship between two different items and provide the sales team more insights about the recommendation results.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:
1. A system comprising:
a non-transitory memory; and
one or more processors coupled to the non-transitory memory and configured to read instructions from the non-transitory memory to cause the system to perform operations comprising:

receiving a user query for generating a recommendation for one or more items and one or more explanations associated with the one or more items;

for each item in a plurality of items:
obtaining input features comprising at least one user feature and at least one item feature;
determining, using one or more relevancy models in one or more first machine learning networks and the input features, a predicted score of the item;
determining, using a first diversity model in second machine learning networks, first diversity scores and a first explainability score for the item from at least a first portion of the input features;
determining, using a second diversity model in the second machine learning networks, second diversity scores and a second explainability score for the item from at least a second portion of the input features, the second portion of the input features different from the first portion of the input features, wherein the second machine learning networks are associated with a weight parameter indicative of the degree of diversity in recommendations;
determining an explanation narrative for the item using the first and second explainability scores; and
combining the predicted score, the first diversity scores of the first diversity model and the second diversity scores of the second diversity model into a combined score for the item;

ranking the plurality of items according to combined scores;
providing the recommendation that includes the one or more items from the plurality of items, wherein the one or more items correspond to top combined scores;
receiving a user input indicative of an updated value for the weight parameter;
generating an updated recommendation for the one or more items and the one or more explanations associated with the one or more items based on the updated value for the weight parameter; and
providing the updated recommendation that includes the one or more items from the plurality of items.

2. The system of claim 1, wherein the operations further comprise:
determining a diversity loss associated with the first and second diversity scores;
determining an accuracy loss using the predicted score; and
determining a total loss using the diversity loss and the accuracy loss.

3. The system of claim 2, wherein the operations further comprise:
training the one or more first machine learning networks and the second machine learning networks to minimize the total loss.

4. The system of claim 1, wherein the operations further comprise determining the explanation narrative concurrently with the first and second explainability scores.

5. The system of claim 1, wherein to determine the predicted score, the operations further comprise:
determining a user vector from the at least one user feature and an item feature in the at least one item feature, wherein the item feature is associated with the user feature;
determining an item vector from the at least one item feature; and
determining the predictive score from the user vector and the item vector.

6. The system of claim 1, wherein the operations further comprise:
determining a popularity score in the first or second explainability score using an item identifier feature in the at least one item feature.

7. The system of claim 1, wherein the operations further comprise:
determining a category score in the first or second explainability score using an item identifier feature in the at least one item feature and at least one category feature from the at least one user feature.

8. The system of claim 1, wherein the operations further comprise:
determining a continuous score in the first or second explainability score using an item identifier feature in the at least one item feature and at least one continuous feature from the at least one user feature.

9. A method comprising:
receiving a user query for generating a recommendation for one or more items and one or more explanations associated with the one or more items;
obtaining a first feature comprising at least one user feature and a second feature comprising at least one item feature from a plurality of items;
determining, using one or more first machine learning networks, the first feature, and the second feature, predicted scores for the plurality of items, wherein the one or more first machine learning networks are trained for a recommendation task;
determining, using a first diversity model in second machine learning networks, a first portion of the first feature and a first portion of the second feature, first diversity scores for the plurality of items and explanation narratives;
determining, using a second diversity model in the second machine learning networks, a second portion of the first feature and a second portion of the second feature, second diversity scores for the plurality of items and the explanation narratives, wherein the second machine learning networks are associated with a weight parameter, and wherein varying the weight parameter during the determining the first diversity score and the second diversity scores changes the one or more items included in the recommendation; and
determining combined scores for the plurality of items from the predicted scores, the first diversity scores from the first diversity model and the second diversity scores from the second diversity model;
identifying the one or more items from the plurality of items as the items with highest scores from the combined scores; and
generating the recommendation that includes the one or more items and corresponding one or more explanation narratives.

10. The method of claim 9, further comprising:
determining a diversity loss associated with the first and second diversity scores;
determining an accuracy loss using the predicted scores; and
determining a total loss using the diversity loss and the accuracy loss.

11. The method of claim 10, further comprising:
training the one or more first machine learning networks and the second machine learning networks to minimize the total loss.

12. The method of claim 9, wherein determining the predicted scores further comprises:
determining a user vector from the at least one user feature and an item feature in the at least one item feature, wherein the item feature is associated with the user feature;
determining an item vector from the at least one item feature; and
determining the predicted scores from the user vector and the item vector.

13. The method of claim 9, further comprising:
determining, using the second machine learning networks, explainability scores for the plurality of items;
determining a popularity score in the explainability scores using an item identifier feature in the at least one item feature; and
determining the one or more explanation narratives based on the popularity score.

14. The method of claim 9, further comprising:
determining, using the second machine learning networks, explainability scores for the plurality of items;
determining a category score in the explainability scores using an item identifier feature in the at least one item feature and at least one category feature from the at least one user feature; and
determining the one or more explanation narratives based on the category score.

15. The method of claim 11, further comprising:
determining, using the second machine learning networks, explainability scores for the plurality of items;
determining a continuous score in the explainability scores using an item identifier feature in the at least one item feature and at least one continuous feature from the at least one user feature; and
determining the one or more explanation narratives based on the continuous score.

16. A non-transitory machine-readable medium having stored thereon machine-readable instructions executable to cause a system to perform operations comprising:
receiving a user query for generating a recommendation for one or more items and one or more explanations associated with the one or more items;
for each item in a plurality of items:
obtaining input features comprising at least one user feature and at least one item feature;
determining, using one or more first machine learning networks and the input features, a predicted score of the item;
determining, using a first diversity model in second machine learning networks, first diversity scores and a first explainability score for the item from at least a first portion of the input features;
determining, using a second diversity model in the second machine learning networks, second diversity scores and a second explainability score for the item from at least a second portion of the input features, wherein the second machine learning networks are associated with a weight parameter indicative of the degree of diversity in recommendations;
combining the predicted score, the first diversity scores of the first diversity model and second diversity scores of the second diversity model into a combined score for the item; and
ranking the plurality of items according to the combined scores;
determining explanation narratives for the ranked plurality of items using the first and second explainability scores;
providing the recommendation that includes the one or more items in the plurality of items that correspond to highest scores and one or more explanation narratives corresponding to the one or more items;
receiving a user input indicative of an updated value for the weight parameter;
generating an updated recommendation for the one or more items and the one or more explanations associated with the one or more items based on the updated value for the weight parameter; and
providing the updated recommendation that includes the one or more items from the plurality of items.

17. The non-transitory machine-readable medium of claim 16, wherein the operations further comprise:
determining an accuracy loss of the one or more first machine learning networks from the predictive score of the item;
determining a diversity loss of the second machine learning networks from the first and second diversity scores; and
determining a total loss from the accuracy loss and the diversity loss.

18. The non-transitory machine-readable medium of claim 16, wherein the first or second explainability score include a category score, a popular score, and a continuous score.

19. The non-transitory machine-readable medium of claim 16, wherein to determine the predicted score, the operations further comprise:
determining a user vector from the at least one user feature and an item feature in the at least one item feature, wherein the item feature is associated with the user feature;
determining an item vector from the at least one item feature; and
determining the predictive score from the user vector and the item vector.

20. The non-transitory machine-readable medium of claim 17, wherein the operations further comprise:
training the one or more first machine learning networks and the second machine learning networks to minimize the total loss.

* * * * *